United States Patent
Jiang et al.

(10) Patent No.: US 12,113,983 B2
(45) Date of Patent: Oct. 8, 2024

(54) INTER-FRAME PREDICTION METHOD BASED ON MERGE WITH MOTION VECTOR DIFFERENCE (MMVD) MODE, VIDEO CODING METHOD, RELATED DEVICE AND APPARATUS

(71) Applicant: ZHEJIANG DAHUA TECHNOLOGY CO., LTD., Hangzhou (CN)

(72) Inventors: Dong Jiang, Hangzhou (CN); Jucai Lin, Hangzhou (CN); Jun Yin, Hangzhou (CN); Feiyang Zeng, Hangzhou (CN); Cheng Fang, Hangzhou (CN)

(73) Assignee: ZHEJIANG DAHUA TECHNOLOGY CO., LTD., Hangzhou (CN)

(*) Notice: Subject to any disclaimer, the term of this patent is extended or adjusted under 35 U.S.C. 154(b) by 290 days.

(21) Appl. No.: 17/676,783

(22) Filed: Feb. 21, 2022

(65) Prior Publication Data
US 2022/0217356 A1 Jul. 7, 2022

Related U.S. Application Data

(63) Continuation of application No. PCT/CN2020/110644, filed on Aug. 21, 2020.

(30) Foreign Application Priority Data

Aug. 21, 2019 (CN) .......................... 201910775394.0

(51) Int. Cl.
H04N 19/137 (2014.01)
H04N 19/105 (2014.01)
(Continued)

(52) U.S. Cl.
CPC ......... *H04N 19/137* (2014.11); *H04N 19/105* (2014.11); *H04N 19/147* (2014.11);
(Continued)

(58) Field of Classification Search
CPC .. H04N 19/105; H04N 19/137; H04N 19/147; H04N 19/159; H04N 19/176;
(Continued)

(56) References Cited

U.S. PATENT DOCUMENTS

2007/0258521 A1  11/2007  Tsai et al.
2012/0128261 A1   5/2012  Lee et al.
(Continued)

FOREIGN PATENT DOCUMENTS

CN        1774933 A    5/2006
CN      104639944 A    5/2015
(Continued)

OTHER PUBLICATIONS

Xu (Hikvision) L et al: "CE4-related : Simplification of candidate list derivation for MMVD mode", 13. JVET Meeting; Jan. 9, 2019-Jan. 18, 2019;Marrakech ; (The Joint Video Exploration Team of ISO/IEC JTC1/SC29/WG11 and ITU-T SG. 16 ),No. JVET-M0330 Jan. 15, 2019 (Jan. 15, 2019) , XP030202221(7 pages).
(Continued)

*Primary Examiner* — Kathleen M Walsh

(57) ABSTRACT

An inter-frame prediction method based on a merge with motion vector difference (MMVD) mode may include: constructing a first candidate list of a current coding block in the MMVD mode, wherein the first candidate list includes a first preset number of first candidate motion vectors (MVs); determining a second preset number of motion search amplitudes and a third preset number of motion search directions; taking the first candidate MV as a starting point, and searching by different motion combinations of the motion
(Continued)

search amplitudes and the motion search directions, to obtain a MV offset of the first candidate MV under the different motion combinations, for each of the first candidate MVs; determining to obtain an optimal MV of the current coding block based on the MV offset of each of the first candidate MVs in the different motion combinations.

20 Claims, 11 Drawing Sheets

(51) Int. Cl.
    *H04N 19/147*     (2014.01)
    *H04N 19/159*     (2014.01)
    *H04N 19/176*     (2014.01)
    *H04N 19/70*     (2014.01)

(52) U.S. Cl.
    CPC ......... *H04N 19/159* (2014.11); *H04N 19/176* (2014.11); *H04N 19/70* (2014.11)

(58) Field of Classification Search
    CPC ...... H04N 19/513; H04N 19/52; H04N 19/56; H04N 19/567; H04N 19/577; H04N 19/70
    USPC ..................................................... 375/240.02
    See application file for complete search history.

(56) References Cited

U.S. PATENT DOCUMENTS

| | | | |
|---|---|---|---|
| 2016/0080760 A1 | 3/2016 | Nakaishi et al. | |
| 2020/0275117 A1* | 8/2020 | Jeong | H04N 19/513 |
| 2020/0296383 A1* | 9/2020 | Li | H04N 19/52 |
| 2020/0404306 A1* | 12/2020 | Auyeung | H04N 19/105 |
| 2021/0006824 A1* | 1/2021 | Jeong | H04N 19/176 |
| 2021/0203945 A1* | 7/2021 | Liu | H04N 19/132 |
| 2021/0211710 A1* | 7/2021 | Zhang | H04N 19/517 |
| 2021/0377520 A1* | 12/2021 | Chen | H04N 19/159 |
| 2023/0098266 A1* | 3/2023 | Ye | H04N 19/105 375/240.25 |

FOREIGN PATENT DOCUMENTS

| | | |
|---|---|---|
| CN | 108419082 A | 8/2018 |
| CN | 108605122 A | 9/2018 |
| CN | 110545424 A | 12/2019 |
| WO | WO2019059575 A2 | 3/2019 |
| WO | WO2019135648 A1 | 7/2019 |

OTHER PUBLICATIONS

European serch report, EP 20854330.6 ,malied Sep. 23, 2022(9 pages).
Seungsoo Jeong et.al. CE4 Ultimate motion vector expression (Test4.5.4) Joint Video Experts Team (JVET) of ITU-T SG 16 WP 3 andISO/IEC JTC 1/sC 29/WG 11 12th Meeting:Macao,CN,JVET-L0054 Oct. 5, 2018(Oct. 5, 2018) the whole document.
Seungsoo Jeong et.al.CE4 Ultimate motion vector expression inJ0024 (Tcst 4.2.9) Joint Video Experts Team (JVET) of ITU-T SGI6 WP 3 and ISO/IEC JTC 1/sC 29/WG 11 11th Meeting:Ljubljana, SI,JVET-K0115 Jul. 12, 2018(Jul. 12, 2018) the whole document.
Naeri Park et.al.CE4-related: Candidatos optimization on MMVDJoint Video Experts Team (JVET) of ITU-T SG 16 WP 3 andISO/IEC JTC 1/SC 29/wG 11 13th Meeting:Marrakech, MA,JVET-M0307 Jul. 12, 2018(Jul. 12, 2018) the whole document.
2019107753940 notification of Registration Procedures.
PCT/CN2020/110644-serch report.
European First examination report ,European Application No. 20854330.6, mailed May 29, 2024 (6 pages).

* cited by examiner

INTER-FRAME PREDICTION METHOD BASED ON MERGE WITH MOTION VECTOR DIFFERENCE (MMVD) MODE, VIDEO CODING METHOD, RELATED DEVICE AND APPARATUS

CROSS-REFERENCE TO RELATED APPLICATIONS

This application is a continuation-application of International (PCT) Patent Application No. PCT/CN2020/110644, filed on Aug. 21, 2020, which claims priority to Chinese Patent Application No. 201910775394.0, filed on Aug. 21, 2019, the contents of which are incorporated herein by reference in their entireties.

TECHNICAL FIELD

The described embodiments relate to a video coding technology, and more particularly, to an inter-frame prediction method based on a merge with motion vector difference (MMVD) mode, a video coding method, a related device, and an apparatus.

BACKGROUND

Since the video image data is larger, it is usually necessary to encode to compress video pixel data (such as RGB, YUV, and so on) to reduce the video data size. The compressed data may be called the video stream. The video stream may pass through a wired or wireless network, to transmit to a client, and then the video stream may be decoded to be displayed.

The entire video coding process may include acquisition, prediction, conversion, transformation quantization, and entropy coding. Inter-frame prediction is often included in the prediction process to remove temporal redundancy of the video image. The inter-frame prediction mode generally includes a triangle mode, an affine mode, a conventional merge mode (i.e., a merge mode), and a merge with motion vector difference (MMVD, or motion vector residual) mode applied in the merge mode, and so on. The inter-frame prediction process needs to predict the optimal motion vector (MV) of a current coded block, and then encodes based on the optimal motion vector. Therefore, when the accuracy of the inter-frame prediction result is low, it may be unable to view during decoding the original video image, or the video image is seriously distorted. The user experience is affected, and even causing the user to miss interesting or important information. In view of this, how to optimize inter-frame prediction has become an urgent problem to be solved.

SUMMARY

The present disclosure provides an inter-frame prediction method based on a merge with motion vector difference (MMVD) mode, a video coding method, a related device, and an apparatus. The accuracy of inter-frame prediction may be improved, or the coding amount of the inter-frame prediction results may be reduced with a greater probability, and the coding compression rate may be increased.

In order to solve the above-mentioned technical problems, the present disclosure provides an inter-frame prediction method based on a merge with motion vector difference (MMVD) mode, including: constructing a first candidate list of a current coding block in the MMVD mode, wherein the first candidate list includes a first preset number of first candidate motion vectors; determining a second preset number of motion search amplitudes and a third preset number of motion search directions; taking the first candidate motion vector as a starting point, and searching by different motion combinations of the motion search amplitudes and the motion search directions, to obtain a motion vector offset of the first candidate motion vector under the different motion combinations, for each of the first candidate motion vectors; determining to obtain an optimal motion vector of the current coding block based on the motion vector offset of each of the first candidate motion vectors in the different motion combinations; wherein, the first preset number, the second preset number, and the third preset number are integers; and the first preset number, the second preset number, and the third preset number are satisfied at least one of the following: the first preset number being greater than 2, the second preset number being greater than 6, the third preset number being greater than 4, and an index value of the motion search direction used by the first candidate motion vectors being related to the corresponding first candidate motion vectors.

In order to solve the above-mentioned technical problems, the present disclosure provides an inter-frame prediction method based on a merge with motion vector difference (MMVD) mode, including: constructing a first candidate list of a current coding block in the MMVD mode, wherein the first candidate list includes a first preset number of first candidate motion vectors; and the first candidate motion vectors include two sub-motion vectors corresponding to two directions respectively; determining a second preset number of motion search amplitudes and a third preset number of motion search directions; taking at least one sub-motion vector of the first candidate motion vectors as a starting point, and searching by different motion combinations of the motion search amplitudes and the motion search directions, to obtain the motion vector offset of the first candidate motion vectors under the different motion combinations, for each of the first candidate motion vectors, wherein the motion vector offset includes two sub-motion vector offsets corresponding to the two directions; determining to obtain an optimal motion vector of the current coding block based on the motion vector offset of each of the first candidate motion vectors in the different motion combinations.

In order to solve the above-mentioned technical problems, the present disclosure provides a video coding method, including: obtaining an optimal motion vector of a current coding block, wherein the motion vector of the current coding block is obtained by the above-mentioned inter-frame prediction method; encoding the current coding block based on the optimal motion vector of the current encoding block and syntax element expression used in the inter-frame prediction method.

In order to solve the above-mentioned technical problems, the present disclosure provides an inter-frame prediction apparatus based on a merge with motion vector difference (MMVD) mode, including: a processor and a memory coupled to each other; wherein the memory is configured to store a program; and the processor is configured to execute the program to implement the above-mentioned inter-frame prediction method.

In order to solve the above-mentioned technical problems, the present disclosure provides a video coding apparatus, including: a processor and a memory coupled to each other; wherein the memory is configured to store a program; and the processor is configured to execute the program to implement the above-mentioned inter-frame prediction method.

In order to solve the above-mentioned technical problems, the present disclosure provides a storage apparatus, including a program stored in the storage device; wherein the program is configured to be executed to implement the above-mentioned inter-frame prediction method.

In this embodiment, a first candidate list of a current coding block in the MMVD mode may be constructed. A second preset number of motion search amplitudes and a third preset number of motion search directions may be determined. The first candidate motion vector may be taken as a starting point. Search may be performed by different motion combinations of the motion search amplitudes and the motion search directions, to obtain a motion vector offset of the first candidate motion vector under the different motion combinations, for each of the first candidate motion vectors. Thereby, the motion vector offset of the corresponding pixel block under the different motion combinations may be used to determine the optimal motion vector of the current coding block.

When the first preset number is greater than 2, the second preset number is greater than 6, or the third preset number is greater than 4, a search range may be expanded to a certain extent, a number of pixel blocks obtained through the search may be increased, and then the optimal motion vector of the current coding block may be determined based on the motion vector offset of the pixel block obtained by the search. Since the number of searched pixel blocks increases, the accuracy of the determined optimal motion vector may be correspondingly improved, thereby the accuracy of inter-frame prediction may be improved.

In addition, when the index value of the motion search direction used by the first candidate motion vector is related to the corresponding first candidate motion vector, since a probability that the motion search direction related to the first candidate motion vector is finally the motion search direction corresponding to the best motion vector of the current coding block, is higher, the index that the motion search direction is the optimal motion vector of the current coding block with a higher probability, may be set smaller. The index that the motion search direction is the optimal motion vector of the current coding block with a higher probability, may be a smaller value. Thus, the number of coding bits as the index value of the motion search direction of the optimal motion vector may be reduced. The amount of code stream data for subsequent video encoding may be reduced, the encoding compression rate may be increased, and the transmission bandwidth of video data and the storage resources of video data may be reduced.

DETAILED DESCRIPTION

Figure 1:
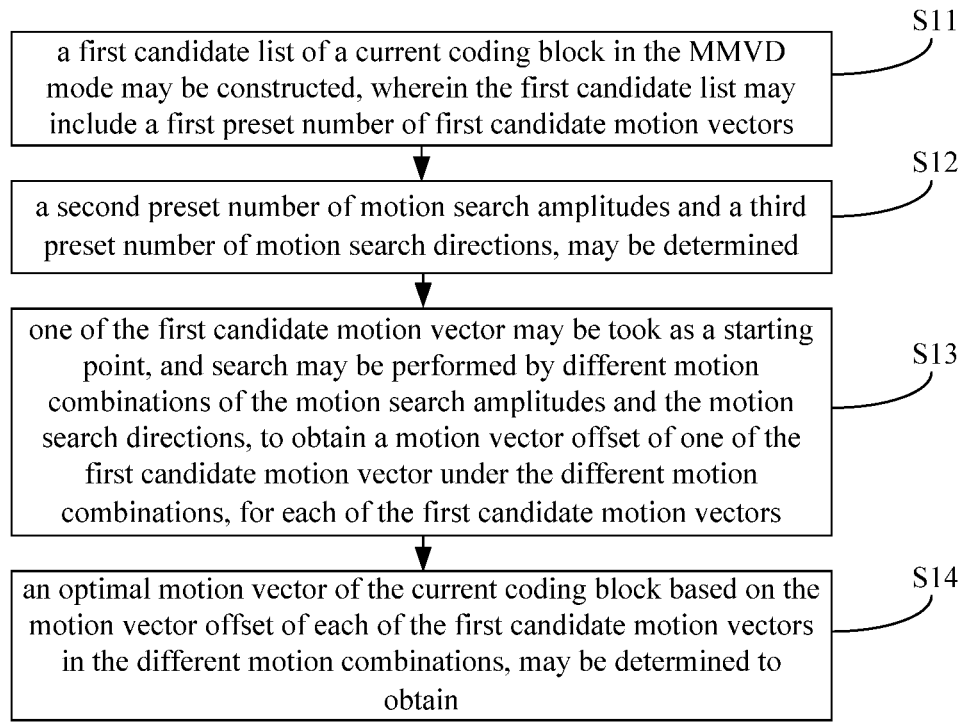
FIG. 1 is a flow chart of an inter-frame prediction method based on a MMVD mode in accordance with an embodiment in the present disclosure.

The detailed description set forth below is intended as a description of the subject technology with reference to the appended figures and embodiments. It is understood that the embodiments described here include merely some parts of the embodiments of the present disclosure, but do not include all the embodiments. Based on the embodiments of the present disclosure, all other embodiments that those skilled in the art may derive from these embodiments are within the scope of the present disclosure.

Terms such as "first", "second", and the like are used herein for purposes of description, and are not intended to indicate or imply relative importance or significance or to imply the number of indicated technical features. Thus, the feature defined with "first", "second", and the like may include one or more of such a feature. In the description of the present disclosure, "a plurality of" means two or more, such as two, three, and the like, unless specified otherwise. All the directional indications (such as up, down, left, right, front, back . . . ) in the embodiments of the disclosure are only used to explain the relative positional relationship, movement, and so on, between the components in a particular posture (as shown in the figure). When the specific posture changes, the directional indication changes accordingly. In addition, terms "including" and "having" and any variations thereof are intended to cover non-exclusive inclusion. For example, a process, a method, a system, a product, or a device that includes a series of steps or units is not limited to the listed steps or units, but optionally includes unlisted steps or units, or optionally also includes other steps or units inherent to these processes, methods, products or devices.

Reference throughout this specification, the reference terms "an embodiment", "some embodiments", "one embodiment", "another example", "an example", "a specific example", or "some examples", and the like means that a specific feature, structure, material, or characteristic described in connection with the embodiment or example is included in at least one embodiment or example of the present disclosure. Thus, the illustrative descriptions of the terms throughout this specification are not necessarily referring to the same embodiment or example of the present disclosure. Furthermore, the specific features, structures, materials, or characteristics may be combined in any suitable manner in one or more embodiments or examples. In addition, one skilled in the art may combine the different embodiments or examples described in this specification and features of different embodiments or examples without conflicting with each other. It should be noted that for the following embodiments of a method, when there are substantially the same results, the method of the present disclosure may be not limited to the sequence of the illustrated process.

For ease of explanation, multiple preset inter-frame prediction modes are introduced in the following.

The Merge Mode

In a conventional merge mode, the method of constructing the motion vector candidate list may be described in the following.

Figure 4:
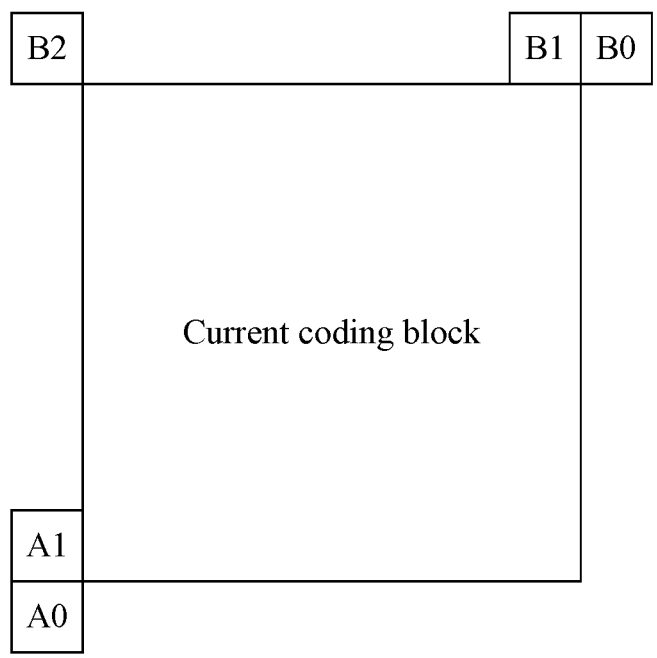
FIG. 4 is an illustration of a positional relationship between a current coding block and a spatial block of an inter-frame prediction method based on a MMVD mode in accordance with an embodiment in the present disclosure.

According to a default acquisition principle of a spatial candidate motion vector of the original conventional merge, as shown in FIG. 4, the encoded block motion vector (i.e., motion information of A0, A1, B0, B1, B2), is treated as a candidate motion vector (MV). For a B-frame and a P-frame, each motion vector includes a forward MV and a backward MV, or includes two forward MVs, or includes two backward MVs. When in the B-frame, both MVs are valid, and when in the P-frame, one of the MVs is invalid.

The motion vector candidate list of the conventional merge mode includes 6 candidate motion vectors. Up to 4 candidate motion vectors may be obtained from the spatial domain. Therefore, the default acquisition principle of spatial candidate motion vectors is A1->B1->B0->A0 (->B2). Only when at least one of A1, B1, B0, and A0 does not exist and the motion vectors of B2 and A1 and B1 are different, the motion vector of B2 will be obtained.

Figure 5:
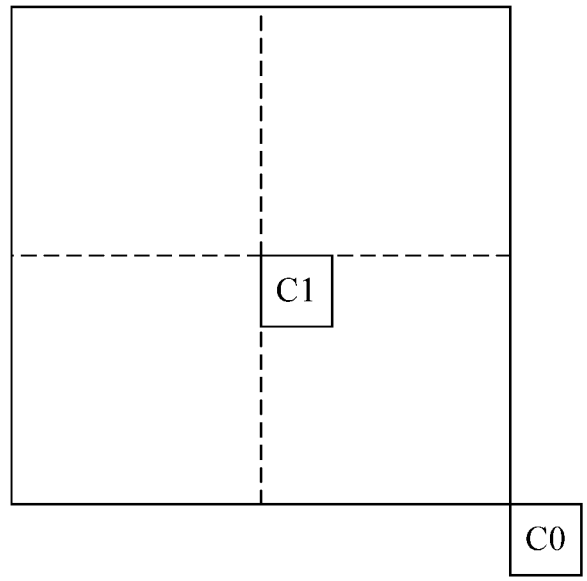
FIG. 5 is an illustration of a positional relationship between a current coding block and a temporal block of an inter-frame prediction method based on a MMVD mode in accordance with an embodiment in the present disclosure.
Figure 6:
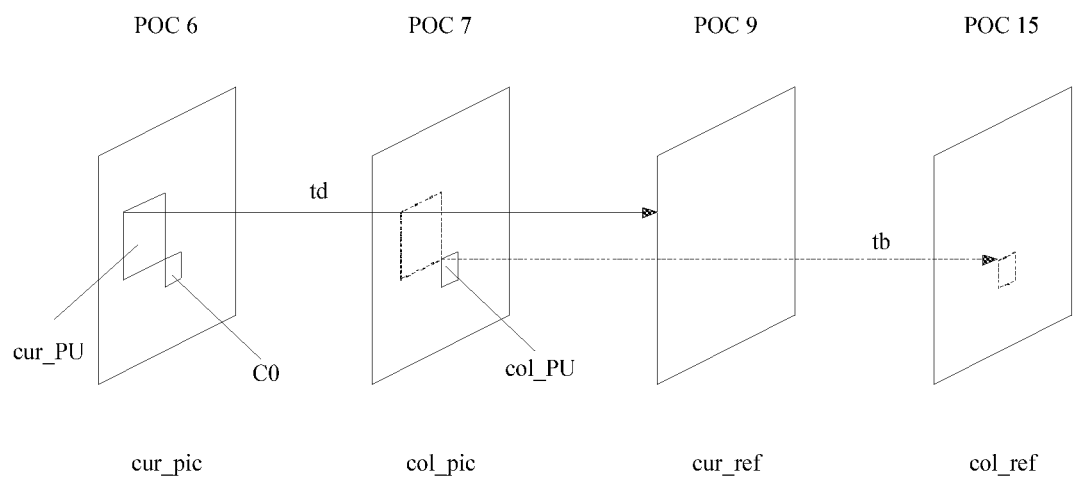
FIG. 6 is an illustration of temporal motion vector scaling of an inter-frame prediction method based on a MMVD mode in accordance with an embodiment in the present disclosure.

When the spatial candidate motion vectors is not used to fill the motion vector candidate list, and the size of the current coding block is greater than 4×4, 8×4, and 4×8, the temporal motion vector needs to be filled in the motion vector candidate list. The temporal motion vector of the current coding block is obtained by scaling the motion vector of the co-located block in the co-located frame of the current frame. As shown in FIG. 5 and FIG. 6, the block at C0 in the current frame is a candidate position for a co-located block. Correspondingly, the block col_PU in the same position as C0 in the co-located frame is a co-located block, so that the motion vector of the co-located block can be obtained. By the distance between the current frame and the reference frame before the current frame, and the distance between the co-located frame and the reference frame of the co-located frame, and scaling the motion vector of co-located block, the temporal motion vector of the current code block is obtained. For details, the temporal motion vector of the current coding block is obtained by the following formula (1).

$$curMV = (td/tb) * colMV \qquad (1)$$

The cur_PU refers to the current coding block. The col_PU refers to the co-located block. The curMV refers to the temporal motion vector of the current coding block. The colMV refers to the temporal motion vector of the co-located block. The td refers to the distance between the current frame (cur_pic) and the reference frame (cur_ref) of the current frame. The tb refers to the distance between the co-located frame (col_pic) and the reference frame (col_ref) of the co-located frame. In an implementation scenario, when the co-located block at position C0 in FIG. 5 is not available, it can be replaced with the co-located block at position C1.

When the merge motion vector candidate list has not been filled, the motion vectors in the HMVP (historical encoded block MV) list are compared with the motion vectors of the spatial domains A1 and B1 sequentially, and the different motion vectors are filled in the candidate list, until the candidate list is filled.

When the merge motion vector candidate list has not been filled, the first two motion vectors in the merge motion vector candidate list are used for averaging (i.e., a average value of a forward motion vector and a forward motion vector, and a average value of a backward motion vector and a backward motion vector), to fill the final average value into the merge motion vector candidate list.

When the merge motion vector candidate list has not been filled, zero motion vectors are filled up to the specified number.

The Advanced Motion Vector Prediction (AMVP) Mode

In a conventional AMVP mode, the method of constructing the motion vector candidate list may be described in the following.

According to a default acquisition principle of a spatial candidate motion vector of the original conventional merge, as shown in FIG. 4, the motion vector of the coded block is selected from the current position of the left and top boundaries of the current coding block (i.e., the motion vector of the adjacent coded block A0 located at the bottom left of the current coded block, the motion vector of the adjacent coded block A1 located on the left boundary of the current coded block, the motion vector of the adjacent coded block B2 located on the top left of the current coded block, the motion vector of the adjacent coded block B1 located on the top side of the current coded block, and the motion vector of the adjacent coded block B0 located on the top right of the current coded block, and the scaled motion vector of the coded block A0-A1/B0-B2) are used as the candidate motion vectors.

The AMVP motion vector candidate list includes two candidate motion vectors. Therefore, candidate motion vectors are obtained respectively at the left boundary and the top boundary of the block to be coded, as spatial candidate motion vectors, and added to the motion vector candidate list. The default acquisition principle of the candidate motion vector of the left boundary is A0->A1->scaled A0->scaled A1. The default acquisition principle of the candidate motion vectors of the top boundary is B0->B1-

>B2 (->scaled B0->scaled B1->scaled B2). When the left boundary (or top boundary) detects the first available candidate motion vector, the candidate motion vector is added to the motion vector candidate list as a spatial candidate motion vector. The other candidate motion vectors of the left boundary (or top boundary) are no longer checked.

When the coded block used to provide the candidate motion vector and the reference frame of the current coded block are the same frame, the motion vector of the coded block is selected to be added to the candidate list. When the reference frames are different, the motion vector of the coded block needs to be scaled and then added to the candidate list. The scaling is based on the distance between the current coded block and the reference frame and the distance between the coded block and the reference frame. The three scaled motion vectors on the top boundary will only be selected when neither A0 nor A1 are available or both are not inter-frame prediction mode.

When the spatial candidate motion vectors are not used to fill the motion vector candidate list, the temporal candidate motion vector, the HMVP, and (0, 0) obtained sequentially are added to the motion vector candidate list until the motion vector candidate list is filled. The HMVP is the motion vector of the coded block in the current coding tree unit (CTU).

The embodiments of the present disclosure may be described in the following from three aspects in combination with the introduction of the above-mentioned prediction modes.

The First Aspect

Referring to FIG. 1, FIG. 1 is a flow chart of an inter-frame prediction method based on a MMVD mode in accordance with an embodiment in the present disclosure. The method may include operations in the following blocks.

Block S11, a first candidate list of a current coding block in the MMVD mode may be constructed, wherein the first candidate list may include a first preset number of first candidate motion vectors.

In an implementation scenario, the first candidate list may specifically be constructed based on the motion vector candidate list constructed in a preset inter-frame prediction mode. In this embodiment, the preset inter-frame prediction mode may include but may be not limited to merge mode and AMVP mode. The motion vector candidate list constructed in the merge mode and the AMVP mode, may refer to the above-mentioned implementation, therefore no more descriptions are given herein.

The first preset number may be an integer. In an implementation scenario, in order to further increase the number of first candidate motion vectors, the first preset number may be specifically set to be greater than 2, such as 3, 4, 5, and so on.

Block S12, a second preset number of motion search amplitudes and a third preset number of motion search directions, may be determined.

The motion search amplitude may include ⅛-pel (pixel), ¼-pel, ½-pel, 1-pel, 2-pel, 4-pel, 8-pel, 16-pel, and so on.

The motion search direction may include right, left, bottom, top, bottom right, bottom left, top right, top left, and so on.

The second preset number may be an integer. In an implementation scenario, in order to further increase the number of the motion search amplitudes, the second preset number may be set to be greater than 6, such as 7, 8, and so on. The second preset number of the motion search amplitudes may be ⅛-pel, ¼-pel, ½-pel, 1-pel, 2-pel, 4-pel, 8-pel, or the second preset number of the motion search amplitudes may also be ¼-pel, ½-pel, 1-pel, 2-pel, 4-pel, 8-pel, 16-pel, and so on. Therefore no additional description is given in this embodiment In addition, in an implementation scenario, in order to facilitate subsequent video encoding, a second preset number of the motion search amplitudes may also be obtained to construct an amplitude list, in which each motion search amplitudes corresponds to an index value. For example, when the second preset number of the motion search amplitudes are ⅛-pel, ¼-pel, ½-pel, 1-pel, 2-pel, 4-pel, 8-pel, index values 0, 1, 2, 3, 4, 5, and 6 may be constructed for the above-mentioned motion search amplitudes respectively; or when the second preset number of the motion search amplitudes are ⅛-pel, ¼-pel, ½-pel, 1-pel, 2-pel, 4-pel, 8-pel, 16-pel, index values 0, 1, 2, 3, 4, 5, 6, and 7 may be constructed for the above-mentioned motion search amplitudes respectively. Table 2 in the following may be referred to for more examples. Therefore no additional description is given in this embodiment. In an implementation scenario, in the constructed amplitude list, the motion search amplitudes may be arranged in ascending order.

The third preset number may be an integer. In an implementation scenario, in order to further increase the number of the motion search directions, the third preset number may be set to be greater than 4, such as 5, 6, 7, 8, and so on. The third preset number of the motion search directions may be right, left, bottom, top, bottom right, or the third preset number of the motion search directions may also be right, left, bottom, top, bottom right, bottom left, top right, top left, and so on. Therefore no additional description is given in this embodiment In addition, in an implementation scenario, in order to facilitate subsequent video encoding, the third present number of the motion search directions may also be obtained to construct a direction list. Each of the motion search directions in the direction list may correspond to an index value. For example, when the third preset number of motion search directions are right, left, bottom, top, bottom right, index values of 0, 1, 2, 3, and 4 may be for the above-mentioned motion search directions respectively; or when the third preset number of motion search directions are right, left, bottom, top, bottom right, bottom left, top right, top left, index values of 0, 1, 2, 3, 4, 5, 6, 7 may be for the above-mentioned motion search directions respectively. Table 3 in the following may be referred for more examples. Therefore no additional description is given in this embodiment In an implementation scenario, in order to further reduce the coding bits of the index value in the motion search directions, and in order to reduce the amount of code stream data for subsequent video encoding, and in order to increase the encoding compression rate, and in order to reduce the transmission bandwidth of video data and the storage resources of video data, when the index value of the motion search directions used by the first candidate motion vector is related to the corresponding first candidate motion vector, a higher probability may be used as the motion search directions corresponding to the optimal motion vector of the current coding block to preferentially obtain the motion search directions as the first candidate motion vector.

Block S13, the first candidate motion vector may be took as a starting point, and search may be performed by different motion combinations of the motion search amplitudes and the motion search directions, to obtain a motion vector offset of the first candidate motion vector under the different motion combinations, for each of the first candidate motion vectors.

The motion search range may be further expanded by different combinations of the motion search amplitudes and the motion search directions. For example, the second preset number of the motion search amplitudes is 7, and the third preset number of the motion search directions is 8, so that 56 search combinations may be expanded; or the second preset number of the motion search amplitudes is 8, and the third preset number of the motion search directions is both 8, that is, the second preset number of the motion search amplitudes may include ⅛ pixel, ¼ pixel, ½ pixel, 1 pixel, 2 pixel, 4 pixel, 8 pixel, and 16 pixel, and the third preset number of the motion search directions may include right, left, bottom, top, bottom right, bottom left, top right, top left, so that 64 search combinations may be expanded.

On this basis, combined with the first preset number of first candidate motion vectors, the search range may be further expanded. For example, the first preset number of the first candidate motion vectors is 3, the second preset number of the motion search amplitudes is 7, and the third preset number of the motion search directions is 8, so that 168 search combinations may be expanded; or the first preset number of the first candidate motion vectors is 5, the second preset number of the motion search amplitudes is 8, and the third preset number of the motion search directions is 8, so that 320 search combinations may be expanded.

For each of the first candidate motion vectors, multiple sets of motion vector offsets may be obtained through multiple combinations of the motion search amplitudes and the motion search directions.

In an implementation scenario, in order to facilitate subsequent video coding, an amplitude list and a direction list may be constructed. Based on the constructed amplitude list and the constructed direction list, the first candidate motion vector may be took as a starting point, and search may be performed by different motion combinations of the motion search amplitudes and the motion search directions, to obtain a motion vector offset of the first candidate motion vector under the different motion combinations.

Block S14, an optimal motion vector of the current coding block based on the motion vector offset of each of the first candidate motion vectors in the different motion combinations, may be determined to obtain.

The optimal motion vector of the current coding block may be determined based on each first candidate motion vectors and its motion vector offset under different motion combinations. In an implementation scenario, the pixel difference between the prediction block indicated by the optimal motion vector of the current coding block and the current coding block may be the smallest.

In this embodiment, the first preset number, the second preset number, and the third preset number may be satisfied at least one of the following: the first preset number being greater than 2, the second preset number being greater than 6, the third preset number being greater than 4, and an index value of the motion search direction used by the first candidate motion vectors being related to the corresponding first candidate motion vectors.

In this embodiment, a first candidate list of a current coding block in the MMVD mode may be constructed. A second preset number of motion search amplitudes and a third preset number of motion search directions may be determined. The first candidate motion vector may be took as a starting point, and searching by different motion combinations of the motion search amplitudes and the motion search directions, to obtain a motion vector offset of the first candidate motion vector under the different motion combinations, for each of the first candidate motion vectors. Thereby, the motion vector offset of the corresponding pixel block under the different motion combinations may be used to determine the optimal motion vector of the current coding block.

When the first preset number is greater than 2, the second preset number is greater than 6, or the third preset number is greater than 4, a search range may be expanded to a certain extent, a number of pixel blocks obtained through the search may be increased, and then the optimal motion vector of the current coding block may be determined based on the motion vector offset of the pixel block obtained by the search. Since the number of searched pixel blocks increases, the accuracy of the determined optimal motion vector may be correspondingly improved, thereby the accuracy of inter-frame prediction may be improved.

In addition, when the index value of the motion search direction used by the first candidate motion vector is related to the corresponding first candidate motion vector, since a probability that the motion search direction related to the first candidate motion vector is finally the motion search direction corresponding to the best motion vector of the current coding block, is higher, the index that the motion search direction is the optimal motion vector of the current coding block with a higher probability, may be set smaller. The index that the motion search direction is the optimal motion vector of the current coding block with a higher probability, may be a smaller value. Thus, the number of coding bits as the index value of the motion search direction of the optimal motion vector may be reduced. The amount of code stream data for subsequent video encoding may be reduced, the encoding compression rate may be increased, and the transmission bandwidth of video data and the storage resources of video data may be reduced.

Figure 2:
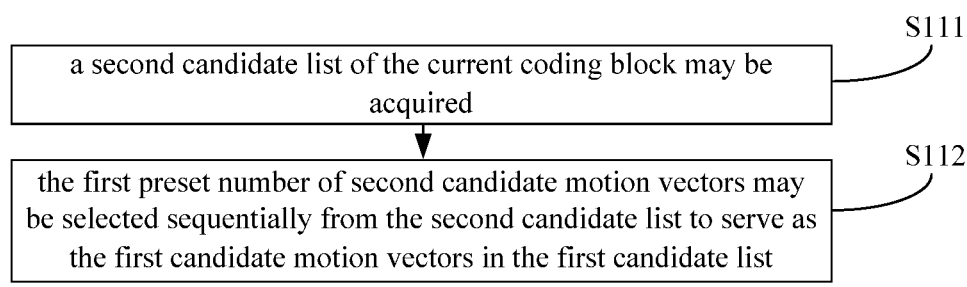
FIG. 2 is a flow chart of block S11 in accordance with an embodiment in FIG. 1.

Referring to FIG. 2, FIG. 2 is a flow chart of block S11 in accordance with an embodiment in FIG. 1. The block S11 may include operations in the following blocks.

Block S111, a second candidate list of the current coding block may be acquired.

In this embodiment, the second candidate list may be constructed in a preset inter-frame prediction mode, and may include several second candidate motion vectors. In this embodiment, the preset inter-frame prediction mode may include but may be not limited to the merge mode and the AMVP mode. The motion vector candidate list constructed in the merge mode and the AMVP mode, may refer to the above-mentioned embodiments, therefore no additional description is given herein. For example, in the merge mode, the second candidate list may be constructed according to the current coding block spatial MV, the temporal MV, the HMVP, the average MV, the zero MV, and so on, and it may include 6 second candidate motion vectors.

Block S112, the first preset number of second candidate motion vectors may be selected sequentially from the second candidate list to serve as the first candidate motion vectors in the first candidate list.

For example, a first preset number of the second candidate motion vectors may be selected from the second candidate list constructed in the merge mode to serve as the first candidate motion vectors in the first candidate list; or a first preset number of the second candidate motion vectors may be selected from the second candidate list constructed in the AMVP mode to serve as the first candidate motion vectors in the first candidate list.

In this embodiment, in order to expand a search range of the subsequent motion search as much as possible and improve the prediction accuracy, the first preset number may be greater than 2, for example, 3, 4, 5, and so on.

In addition, in this embodiment, each of the first candidate motion vectors may include MVs in two directions, such as a forward MV and a backward MV, or a forward MV and a forward MV, or a backward MV and a backward MV.

In addition, several second candidate motion vectors selected from the second candidate list may include a spatial candidate motion vector and a temporal candidate motion vector, so that the constructed first candidate list may include a spatial candidate motion vector and a temporal candidate motion vector.

Figure 3:
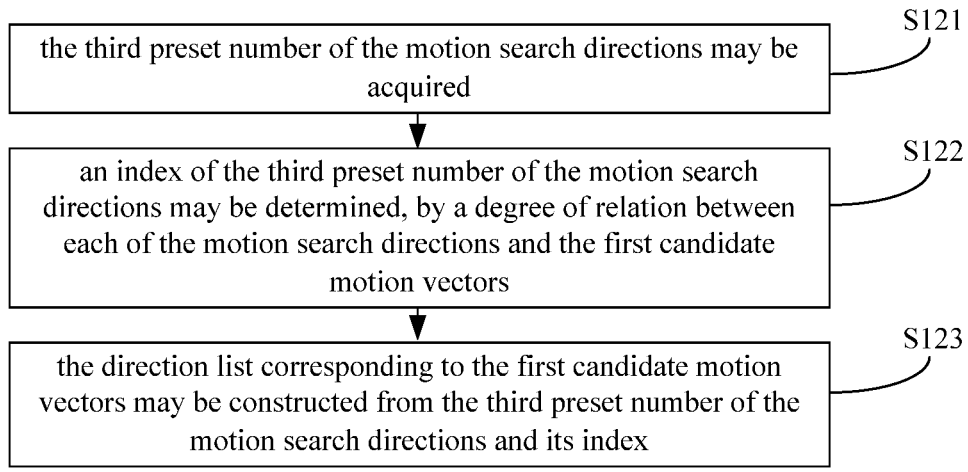
FIG. 3 is a flow chart of block S12 in accordance with an embodiment in FIG. 1.

Referring to FIG. 3, FIG. 3 is a flow chart of block S12 in accordance with an embodiment in FIG. 1. The block S11 may include operations in the following blocks. In the above-mentioned embodiment, the operations in block S12, "the third preset number of the motion search directions may be acquired to construct the direction list", may include operations in the following blocks.

Block S121, the third preset number of the motion search directions may be acquired.

For example, when the third preset number is 8, 8 motion search directions may be acquired. The 8 motion search directions may be right, left, bottom, top, bottom right, bottom left, top right, and top left. The third preset number may also be other values, and the motion search directions may be obtained, therefore no additional description is given herein.

Block S122, an index of the third preset number of the motion search directions may be determined, by a degree of relation between each of the motion search directions and the first candidate motion vectors.

The index is a code that uniquely identifies the motion search direction. The motion search direction may be determined through the index. For example, in the above-mentioned 8 motion search directions, the right index may be 0, the left index may be 1, the bottom index may be 2, the top index may be 3, the bottom right index may be 4, and the bottom left index may be 5, the top right index may be 6, and the top left index may be 7. The index of the motion search directions may also be other values, therefore no additional description is given herein.

In an implementation scenario, in order to reduce the coding bits of the index value in the motion search directions, and in order to reduce the amount of code stream data for subsequent video encoding, and in order to increase the encoding compression rate, and in order to reduce the transmission bandwidth of video data and the storage resources of video data, when the index value of the motion search directions used by the first candidate motion vector is related to the corresponding first candidate motion vector, the motion search direction corresponding to the optimal motion vector of the current coding block may be obtained first with a higher probability, as the motion search direction of the first candidate motion vector. The more relevant the first candidate motion vector, the smaller the index in the direction list of the motion search directions. For example, the first candidate motion vector may be (16,16), then the index of the motion search directions at the bottom right in the direction list constructed for the first candidate motion vector may be 0. Same, the index of the motion search directions on the right may be 1. The index of the motion search directions on the bottom may be 2. The index of the motion search directions on the top right may be 3. The index of the motion search directions on the bottom left may be 4. The index of the motion search directions on the top may be 5. The index of the motion search directions on the left may be 6. The motion search directions on the top left is the least relevant to the first candidate motion vector, so that the index may be 7. In addition, since the correlation between the right and the bottom and the bottom right may be equivalent, the indexes of the two may be exchanged with each other, that is, the index of the motion search directions on the bottom may be 1, and the index of the motion search directions on the right is 2, and so on. The index of the motion search directions on the top right and bottom left may also be exchanged. The index of the motion search directions on the top and left may also be exchanged.

Block S123, the direction list corresponding to the first candidate motion vectors may be constructed from the third preset number of the motion search directions and its index.

From the third preset number of motion search directions and its indexes, a list of directions corresponding to the first candidate motion vector may be constructed. For example, when one of the MVs of the first candidate motion vector is (16, 16), the direction list shown in table 1 below may be constructed.

TABLE 1

| the direction list of the first candidate motion vector | | | | | | | | |
|---|---|---|---|---|---|---|---|---|
| index | 0 | 1 | 2 | 3 | 4 | 5 | 6 | 7 |
| motion search directions | bottom right | right | bottom | top right | bottom left | top | left | top left |

In this embodiment, the direction list used in the motion search with the first candidate motion vector as the starting point may be the direction list of the first candidate motion vector. For example, the direction list used in the motion search with the motion vector (16, 16) as the starting point may be the direction list in the above-mentioned table 1. When the first candidate motion vector has other values, the corresponding direction list may be obtained, and when the first candidate motion vector is used as the starting point, the corresponding direction list may be adopted.

The first candidate motion vector may include two sub-motion vectors corresponding to two directions respectively. Both directions may be forward or backward, or one may be forward and the other may be backward. When a current frame which the current coding block located is a B-frame, the above-mentioned block S13 may include operations in the following: taking at least one sub-motion vector of the first candidate motion vectors as a starting point, and searching by different motion combinations of the motion search amplitudes and the motion search directions, to obtain the motion vector offset of the first candidate motion vectors under the different motion combinations, wherein the motion vector offset includes two sub-motion vector offsets corresponding to the two directions. In other words, two sub-motion vector of the first candidate motion vectors may be took respectively as a starting point, and search may be performed by different motion combinations of the motion search amplitudes and the motion search directions, to obtain respectively two sub-motion vector offsets of the two sub-motion vectors under the different motion combinations. Since a process that the two sub-motion vectors obtain the respective sub-motion vector offsets are independent and uncorrelated, the motion vector offsets of the first candidate motion vector in different combinations may be obtained through free combination. Further, one sub-motion vector of the first candidate motion vectors may also be took as a starting point, and search may be performed by different motion combinations of the motion search amplitudes and the motion search directions, to obtain a sub-motion vector offset of the sub-motion vector under the different motion combinations. Therefore, the sub-motion vector offset of another sub-motion vector may be obtained by deriving, and the motion vector offset under different combinations of the first candidate motion vector may be obtained through the corresponding motion combination. An amplitude relationship of at least two sub-motion vectors may be used to determine which sub-motion vector adopts the search method and which sub-motion vector adopts the derivation method. The above-mentioned operation for obtaining a motion vector offset may improve the accuracy of the motion vector offset. When the final determined optimal motion vector is the motion vector corresponding to the motion vector offset, the accuracy of acquiring the optimal motion vector may be also improved, and thus the accuracy of inter-frame prediction may be improved.

In addition, when a current frame which the current coding block located is a P-frame, since one of the two sub-motion vectors included in the first candidate motion vector is an invalid MV, the other MV may only be obtained by searching a motion vector offset.

The following are examples in two sub-aspects to explain obtaining the motion vector offset of the first candidate motion vector by searching, and obtaining the motion vector offset of the first candidate motion vector by searching and deriving.

The First Sub-Aspect

Figure 7:
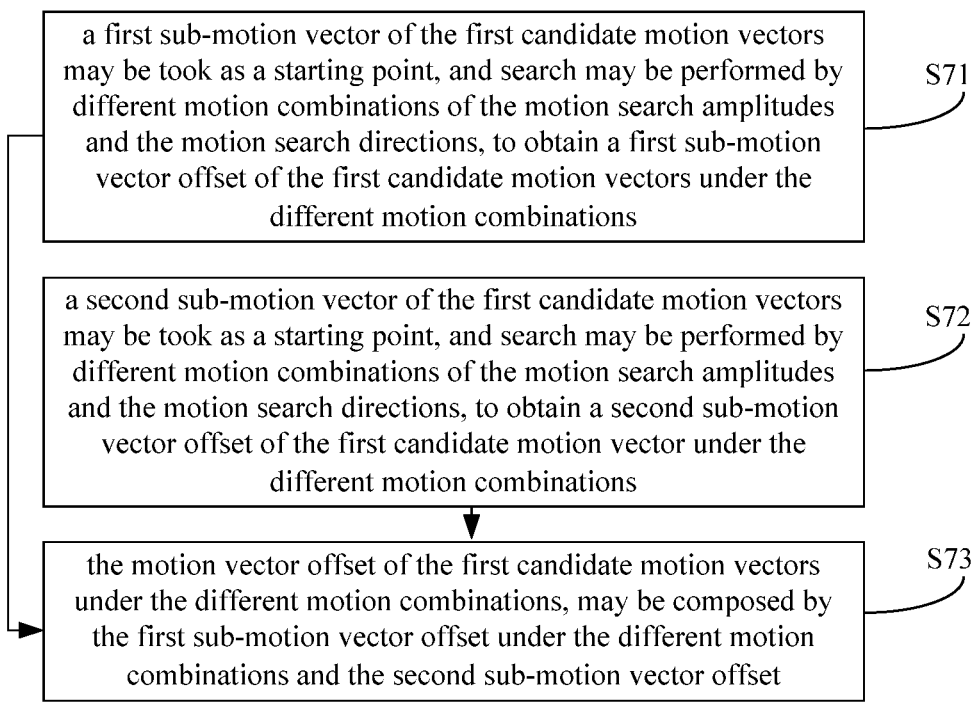
FIG. 7 is a flow chart of block S13 in accordance with an embodiment in FIG. 1.

Referring to FIG. 7, FIG. 7 is a flow chart of block S13 in accordance with an embodiment in FIG. 1. The block S13 may include operations in the following blocks.

Block S71, a first sub-motion vector of the first candidate motion vectors may be took as a starting point, and search may be performed by different motion combinations of the motion search amplitudes and the motion search directions, to obtain a first sub-motion vector offset of the first candidate motion vectors under the different motion combinations.

In this embodiment, there is the preset second number of motion search amplitudes, and the third preset number of motion search directions. Therefore a first sub-motion vector of the first candidate motion vectors may be took as a starting point, and search may be performed by different motion combinations of the motion search amplitudes and the motion search directions, to obtain a first sub-motion vector offset of the first candidate motion vectors under the different motion combinations. A number of the first sub-motion vector offsets may be product of the second preset number and the third preset number.

For example, the first sub-motion vector of the first candidate motion vector may be (16, −16), and the MV may be stored in 1/16 pixel accuracy, i.e., the MV may be actually (1, −1). The amplitude list constructed by the second preset number of the motion search amplitudes may be shown in table 2 in the following.

TABLE 2 the amplitude list of the first sub-motion vector

| index | 0 | 1 | 2 | 3 | 4 | 5 | 6 | 7 |
|---|---|---|---|---|---|---|---|---|
| motion search amplitude | ⅛-pel | ¼-pel | ½-pel | 1-pel | 2-pel | 4-pel | 8-pel | 16-pel |

In addition, since the first sub-motion vector is (16, −16), the direction list composed of the third preset number of the motion search directions may be constructed according to a smaller the index of the more relevant search direction in the direction list as shown in the following table 3.

TABLE 3 the direction list of the first sub-motion vector

| index | 0 | 1 | 2 | 3 | 4 | 5 | 6 | 7 |
|---|---|---|---|---|---|---|---|---|
| motion search direction | top right | right | top | bottom right | top left | bottom | left | bottom left |

Thus, the first sub-motion vector (16, −16) may be used, and the above-mentioned 8 motion search amplitudes and the above 8 motion search directions with a total of 64 combinations may be used, so that the first sub-motion vector offset of the first candidate motion vector under different motion combinations may be obtained. Take a motion search amplitude as ½-pel and a motion search direction as the lower right as an example, and the first sub-motion vector offset under this combination may be (8,8). When the motion search amplitudes and the motion search directions are in other combinations, the first sub-motion vector offset may be derived in the same operations. Therefore no additional description is given in this embodiment.

Block S72, a second sub-motion vector of the first candidate motion vectors may be took as a starting point, and search may be performed by different motion combinations of the motion search amplitudes and the motion search directions, to obtain a second sub-motion vector offset of the first candidate motion vector under the different motion combinations.

In this embodiment, there is the preset second number of motion search amplitudes, and the third preset number of motion search directions. Therefore a second sub-motion vector of the first candidate motion vectors may be took as a starting point, and search may be performed by different motion combinations of the motion search amplitudes and the motion search directions, to obtain a second sub-motion vector offset of the first candidate motion vectors under the different motion combinations. A number of the second sub-motion vector offsets may be product of the second preset number and the third preset number.

For example, the second sub-motion vector of the first candidate motion vector may be (−32, 40), and the MV may be stored in 1/16 pixel accuracy. The amplitude list constructed by the second preset number of the motion search amplitudes may be shown in table 4 in the following.

TABLE 4 the amplitude list of the second sub-motion vector

| index | 0 | 1 | 2 | 3 | 4 | 5 | 6 | 7 |
|---|---|---|---|---|---|---|---|---|
| motion search amplitude | ⅛-pel | ¼-pel | ½-pel | 1-pel | 2-pel | 4-pel | 8-pel | 16-pel |

In addition, since the second sub-motion vector is (−32, 40), the direction list composed of the third preset number of the motion search directions may be constructed according to a smaller the index of the more relevant search direction in the direction list as shown in the following table 5.

TABLE 5

| | the direction list of the second sub-motion vector | | | | | | | |
|---|---|---|---|---|---|---|---|---|
| index | 0 | 1 | 2 | 3 | 4 | 5 | 6 | 7 |
| motion search direction | bottom left | bottom | left | bottom right | top left | right | top | top right |

Thus, the second sub-motion vector (−32, 40) may be used, and the above-mentioned 8 motion search amplitudes and the above-mentioned 8 motion search directions with a total of 64 combinations may be used, so that the second sub-motion vector offset of the first candidate motion vector under different motion combinations may be obtained. Take a motion search amplitude as 4-pel and a motion search direction as the bottom right as an example, and the second sub-motion vector offset under this combination may be (−64, −64). When the motion search amplitudes and the motion search directions are in other combinations, the second sub-motion vector offset may be derived in the same operations. Therefore no additional description is given in this embodiment.

Block S73, the motion vector offset of the first candidate motion vectors under the different motion combinations, may be composed by the first sub-motion vector offset under the different motion combinations and the second sub-motion vector offset.

The motion vector offset of the first candidate motion vectors under the different motion combinations, may be composed by the first sub-motion vector offset under the different motion combinations and the second sub-motion vector offset. Taking the above-mentioned 8 motion search directions and 8 motion search amplitudes as examples, and 64 first sub-motion vector offsets and 64 second sub-motion vector offsets may be generated, and finally 64*64 sets of motion vector offsets may be freely combined.

In the embodiment of the first sub-aspect, expression of syntax element of the MMVD mode may include syntax elements in two directions of the first candidate motion vectors. The syntax element of each direction may include the motion vector offset, or a motion search direction index in the motion combinations corresponding to the motion vector offset.

In this embodiment, the first sub-motion vector and the second sub-motion vector of the first candidate motion vectors may be took as a starting point respectively, and search may be performed by different motion combinations of the motion search amplitudes and the motion search directions, to obtain the first sub-motion vector offset of the first candidate motion vectors under the different motion combinations, and to obtain the second sub-motion vector offset of the first candidate motion vectors under the different motion combinations. The motion vector offset of the first candidate motion vectors under the different motion combinations, may be composed by the first sub-motion vector offset under the different motion combinations and the second sub-motion vector offset. Thereby, the range of motion search may be further increased. It may be beneficial to find more accurate motion vectors, and thus may be beneficial to further improve the accuracy of inter-frame prediction.

The Second Sub-Aspect

Figure 8:
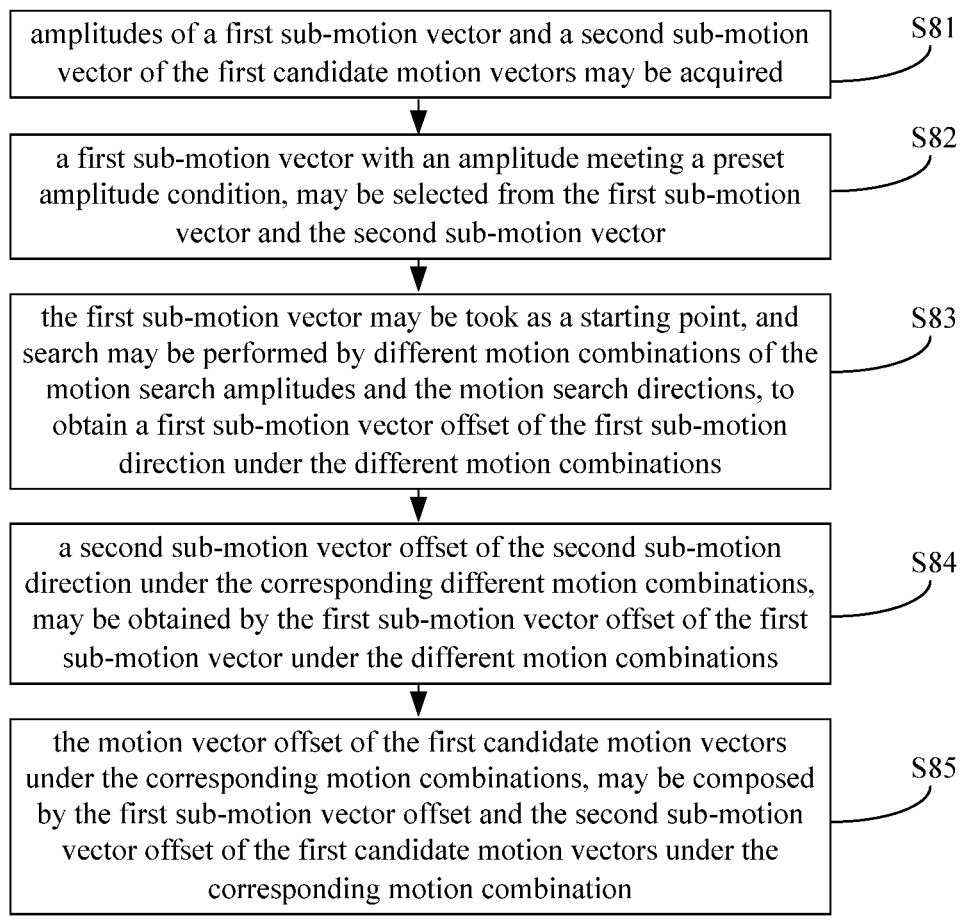
FIG. 8 is a flow chart of block S13 in accordance with an embodiment in FIG. 1.

Referring to FIG. 8, FIG. 8 is a flow chart of block S13 in accordance with an embodiment in FIG. 1. The block S13 may include operations in the following blocks.

Block S81, amplitudes of a first sub-motion vector and a second sub-motion vector of the first candidate motion vectors may be acquired.

The amplitudes of the first sub-motion vector and the second sub-motion vector of the first candidate motion vectors may be acquired. For example, the amplitude MV0 of the first sub-motion vector and the amplitude MV1 of the second sub-motion vector of the first candidate motion vector MV may be acquired.

Block S82, a first sub-motion vector with an amplitude meeting a preset amplitude condition, may be selected from the first sub-motion vector and the second sub-motion vector.

The first sub-motion vector which the amplitude meets the preset amplitude condition, may be selected from the first sub-motion vector and the second sub-motion vector.

Block S83, the first sub-motion vector may be took as a starting point, and search may be performed by different motion combinations of the motion search amplitudes and the motion search directions, to obtain a first sub-motion vector offset of the first sub-motion direction under the different motion combinations.

The first sub-motion vector may be took as the starting point, and search may be performed by different motion combinations of the motion search amplitudes and the motion search directions, to obtain the first sub-motion vector offset of the first sub-motion direction under the different motion combinations. Operations of above-mentioned the first sub-aspect may be referred to search by different motion combinations of the motion search amplitudes and the motion search directions, so as to obtain the first sub-motion vector offset of the first sub-motion direction under different motion combinations.

Block S84, a second sub-motion vector offset of the second sub-motion direction under the corresponding different motion combinations, may be obtained by the first sub-motion vector offset of the first sub-motion vector under the different motion combinations.

The second sub-motion vector offset of the second sub-motion direction under the corresponding different motion combinations, may be obtained by the first sub-motion vector offset of the first sub-motion vector under the different motion combinations.

Block S85, the motion vector offset of the first candidate motion vectors under the corresponding motion combinations, may be composed by the first sub-motion vector offset and the second sub-motion vector offset of the first candidate motion vectors under the corresponding motion combination.

The motion vector offset of the first candidate motion vectors under the corresponding motion combinations, may be composed by the first sub-motion vector offset and the second sub-motion vector offset of the first candidate motion vectors under the corresponding motion combination.

In the above-mentioned block S82, the preset amplitude condition may use the amplitudes of the first sub-motion vector and the second sub-motion vector as an influencing factor. In addition, the preset amplitude condition may also be took as the influence factor, based on the amplitude of the first sub-motion vector and the second sub-motion vector, based on the distance between the reference frame corresponding to the first sub-motion vector and the current frame, and based on the distance between the reference frame corresponding to the second sub-motion vector and the current frame.

Figure 9:
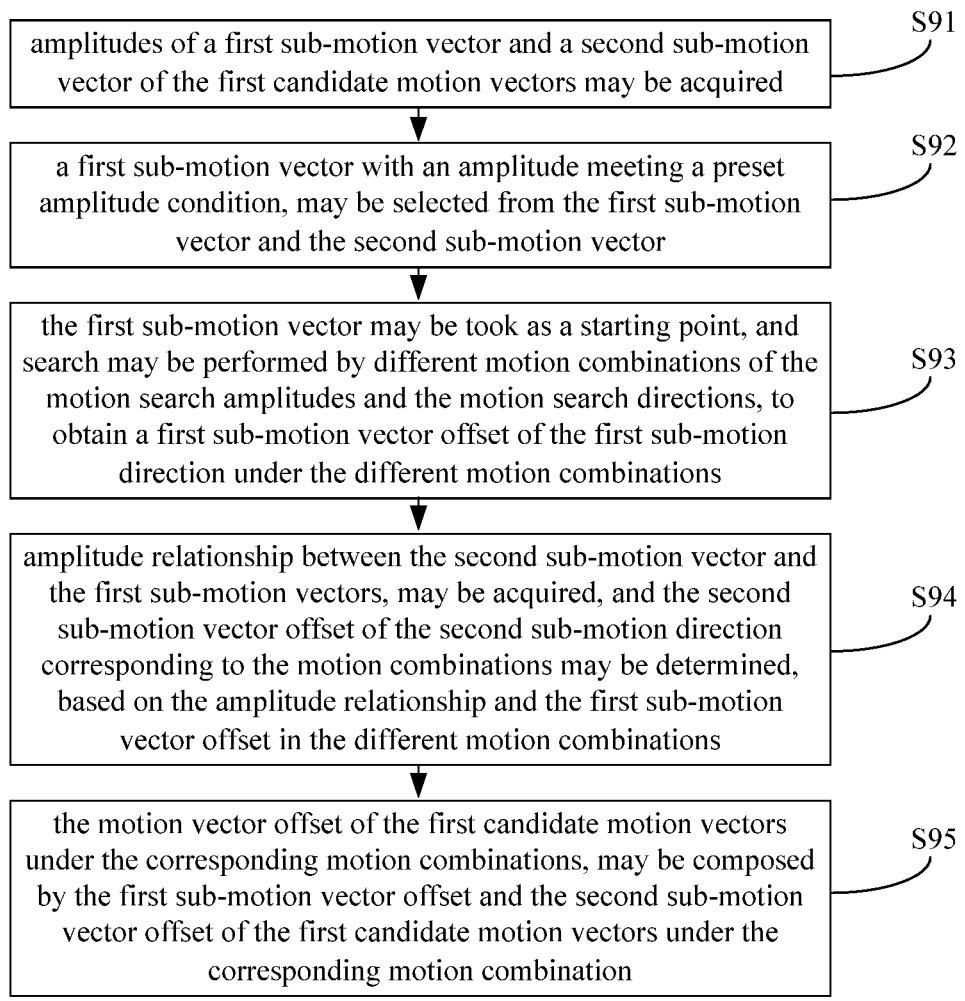
FIG. 9 is a flow chart of block S13 in accordance with an embodiment in FIG. 1.

When the preset amplitude condition may use the amplitude of the first sub-motion vector and the second sub-motion vector as the influencing factor, a preset amplitude condition may be that which one of an amplitude of the first sub-motion vector and an amplitude of the second sub-motion vector is greater or equal. In this case, referring to FIG. 9, FIG. 9 is a flow chart of block S13 in accordance with an embodiment in FIG. 1. The block S13 may include operations in the following blocks.

Block S19, amplitudes of a first sub-motion vector and a second sub-motion vector of the first candidate motion vectors may be acquired.

For example, an amplitude MV0 of the first sub-motion vector and an amplitude MV1 of the second sub-motion vector of the first candidate motion vector MV may be acquired.

Block S92, a first sub-motion vector with an amplitude meeting a preset amplitude condition, may be selected from the first sub-motion vector and the second sub-motion vector.

For example, when the sub-motion vector with the amplitude MV0 is greater than the sub-motion vector with amplitude MV1, the sub-motion vector with the amplitude MV0 may be selected as the first sub-motion vector.

For example, when the sub-motion vector with the amplitude MV1 is greater than the sub-motion vector with amplitude MV0, the sub-motion vector with the amplitude MV1 may be selected as the first sub-motion vector.

For example, when the sub-motion vector with the amplitude MV0 is equal to the sub-motion vector with amplitude MV1, the sub-motion vector with the amplitude MV0 may be selected as the first sub-motion vector, or the sub-motion vector with the amplitude MV1 may also be selected as the first sub-motion vector.

Block S93, the first sub-motion vector may be took as a starting point, and search may be performed by different motion combinations of the motion search amplitudes and the motion search directions, to obtain a first sub-motion vector offset of the first sub-motion direction under the different motion combinations.

For example, when the sub-motion vector with the amplitude MV0 is greater than the sub-motion vector with amplitude MV1, and the sub-motion vector with the amplitude MV0 may be selected as the first sub-motion vector, the first sub-motion vector may be took as a starting point, and search may be performed by different motion combinations of the motion search amplitudes and the motion search directions, to obtain a first sub-motion vector offset MMVD0 of the first sub-motion direction under the different motion combinations.

For example, when the sub-motion vector with the amplitude MV1 is greater than the sub-motion vector with amplitude MV0, and the sub-motion vector with the amplitude MV1 may be selected as the first sub-motion vector, the first sub-motion vector may be took as a starting point, and search may be performed by different motion combinations of the motion search amplitudes and the motion search directions, to obtain a first sub-motion vector offset MMVD1 of the first sub-motion direction under the different motion combinations.

For example, when the sub-motion vector with the amplitude MV0 is equal to the sub-motion vector with amplitude MV1, and the sub-motion vector with the amplitude MV0 may be selected as the first sub-motion vector, the first sub-motion vector may be took as a starting point, and search may be performed by different motion combinations of the motion search amplitudes and the motion search directions, to obtain a first sub-motion vector offset MMVD0 of the first sub-motion direction under the different motion combinations.

Block S94, an amplitude relationship between the second sub-motion vector and the first sub-motion vectors, may be acquired, and the second sub-motion vector offset of the second sub-motion direction corresponding to the motion combinations may be determined, based on the amplitude relationship and the first sub-motion vector offset in the different motion combinations.

The amplitude relationship may be a ratio of amplitude values, or a positive correlation function such as logarithm of amplitude and amplitude index, and it is not limited in this embodiment. In an embodiment, the amplitude ratio between the second sub-motion vector and the first sub-motion vector may be obtained, and the product of the amplitude ratio and the first sub-motion vector offset in different motion combinations may be used as the second sub-motion vector offset of the second sub-motion direction in the corresponding motion combination.

For example, when the sub-motion vector with the amplitude MV0 is greater than the sub-motion vector with amplitude MV1, and the sub-motion vector with the amplitude MV0 may be selected as the first sub-motion vector, and the first sub-motion vector may be took as a starting point, and search may be performed by different motion combinations of the motion search amplitudes and the motion search directions, to obtain a first sub-motion vector offset MMVD0=mmvdoffset of the first sub-motion direction under the different motion combinations, the amplitude ratio MV1/MV0 between the second sub-motion vector and the first sub-motion vector may be obtained. The product of the amplitude ratio MV1/MV0 and the first sub-motion vector offset MMVD0 in different motion combinations (MV1/MV0)*MMVD0 may be took as the second sub-motion vector offset of the second sub-motion direction in the corresponding motion combination MMVD1, i.e., MMVD1=(MV1/MV0)*MMVD0.

For example, when the sub-motion vector with the amplitude MV1 is greater than the sub-motion vector with amplitude MV0, and the sub-motion vector with the amplitude MV1 may be selected as the first sub-motion vector, and the first sub-motion vector may be took as a starting point, and search may be performed by different motion combinations of the motion search amplitudes and the motion search directions, to obtain a first sub-motion vector offset MMVD1=mmvdoffset of the first sub-motion direction under the different motion combinations, the amplitude ratio MV0/MV1 between the second sub-motion vector and the first sub-motion vector may be obtained. The product of the amplitude ratio MV0/MV1 and the first sub-motion vector offset MMVD1 in different motion combinations (MV0/MV1)*MMVD1 may be took as the second sub-motion vector offset of the second sub-motion direction in the corresponding motion combination MMVD0, i.e., MMVD0=(MV0/MV1)*MMVD1.

For example, when the sub-motion vector with the amplitude MV0 is equal to the sub-motion vector with amplitude MV1, and the sub-motion vector with the amplitude MV0 may be selected as the first sub-motion vector, and the first sub-motion vector may be took as a starting point, and search may be performed by different motion combinations of the motion search amplitudes and the motion search directions, to obtain a first sub-motion vector offset MMVD0=mmvdoffset of the first sub-motion direction under the different motion combinations, the amplitude ratio MV1/MV0 (i.e., 1) between the second sub-motion vector and the first sub-motion vector may be obtained. The product of the amplitude ratio 1 and the first sub-motion vector offset MMVD0 in different motion combinations 1*MMVD0 may be took as the second sub-motion vector offset of the second sub-motion direction in the corresponding motion combination MMVD1, i.e., MMVD1=MMVD0=mmvdoffset.

Block S95, the motion vector offset of the first candidate motion vectors under the corresponding motion combinations, may be composed by the first sub-motion vector offset and the second sub-motion vector offset of the first candidate motion vectors under the corresponding motion combination.

The motion vector offset of the first candidate motion vectors under the corresponding motion combinations, may be composed by the first sub-motion vector offset and the second sub-motion vector offset of the first candidate motion vectors under the corresponding motion combination.

Figure 10:
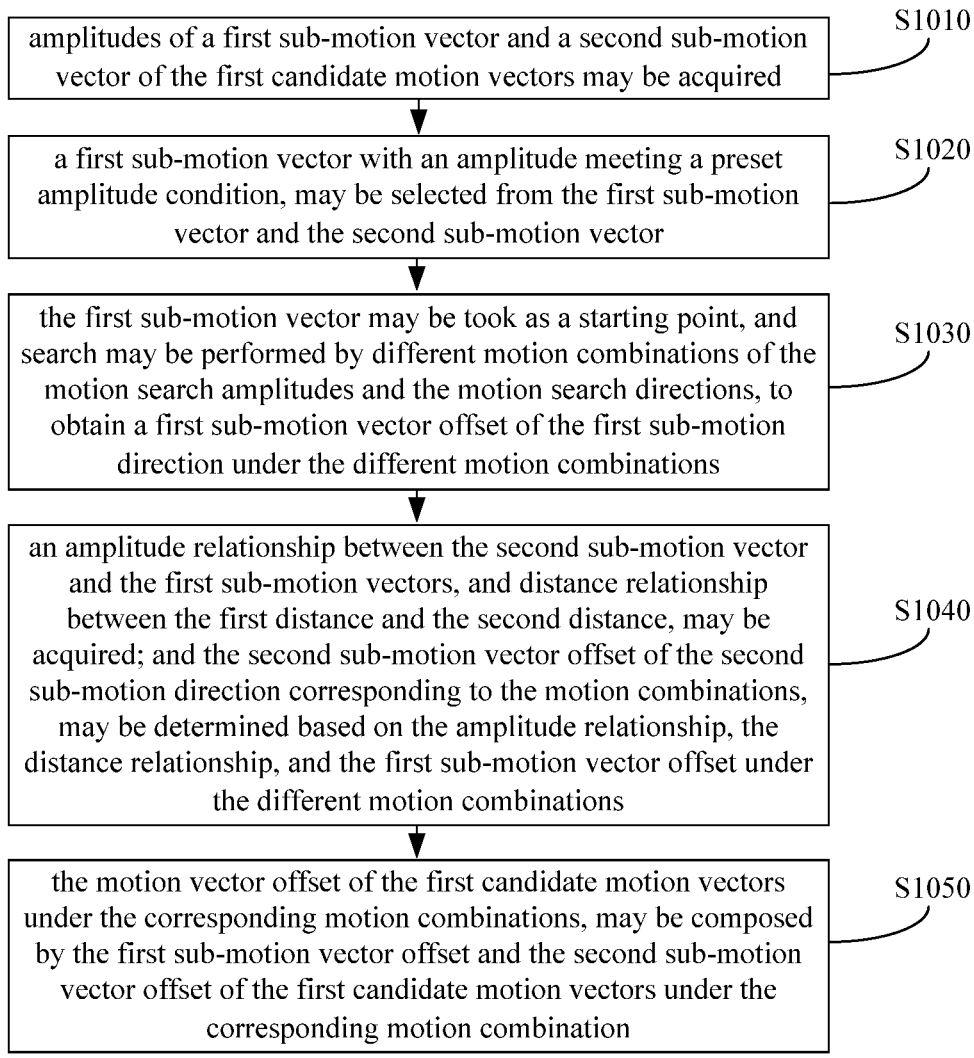
FIG. 10 is a flow chart of block S13 in accordance with an embodiment in FIG. 1.

When the preset amplitude condition adopts the amplitudes of the first sub-motion vector and the second sub-motion vector, the distance between the reference frame corresponding to the first sub-motion vector and the current frame, and the distance between the reference frame corresponding to the second sub-motion vector and the current frame, as an influencing factor, the preset amplitude condition may be that which one of quotient of the amplitude of the first sub-motion vector and corresponding distance and quotient of the amplitude of the second sub-motion vector and corresponding distance is greater or equal. The corresponding distance of the first sub-motion vector may be first distance between a first reference frame corresponding to the first sub-motion vector and the current frame. The corresponding distance of the second sub-motion vector may be second distance between a second reference frame corresponding to the second sub-motion vector and the current frame. For example, the distance currPocDiffL0 corresponding to the sub-motion vector with amplitude MV0 may be the difference between the corresponding reference frame playback sequence number POC0 and the current frame playback sequence number POC, i.e., currPocDiffL0=POC−POC0, The distance currPocDiffL1 corresponding to the sub-motion vector with amplitude MV1 may be the difference between the corresponding reference frame playback sequence number POC1 and the current frame playback sequence number POC, i.e., currPocDiffL1=POC−POC1. In this case, referring to FIG. 10, FIG. 10 is a flow chart of block S13 in accordance with an embodiment in FIG. 1. The block S13 may include operations in the following blocks.

Block S1010, amplitudes of a first sub-motion vector and a second sub-motion vector of the first candidate motion vectors may be acquired.

For example, the amplitude MV0 of the first sub-motion vector and the amplitude MV1 of the second sub-motion vector of the first candidate motion vector MV may be acquired.

Block S1020, a first sub-motion vector with an amplitude meeting a preset amplitude condition, may be selected from the first sub-motion vector and the second sub-motion vector.

For example, in a case of the sub-motion vector with amplitude MV0 and the sub-motion vector with amplitude MV1, when the quotient MV0/abs(currPocDiffL0) of the sub-motion vector with amplitude MV0 and the corresponding distance is greater than the quotient MV1/abs(currPocDiffL1) of the sub-motion vector with amplitude MV1 and the corresponding distance, the sub-motion vector with the amplitude MV0 may be selected as the first sub-motion vector. The first distance corresponding to the first motion vector with amplitude MV0 may be currPocDiffL0. The second distance corresponding to the sub-motion vector with amplitude MV1 may be currPocDiffL1.

For example, in a case of the sub-motion vector with amplitude MV0 and the sub-motion vector with amplitude MV1, when the quotient MV1/abs(currPocDiffL1) of the sub-motion vector with amplitude MV1 and the corresponding distance is greater than the quotient MV0/abs(currPocDiffL0) of the sub-motion vector with amplitude MV1 and the corresponding distance, the sub-motion vector with the amplitude MV1 may be selected as the first sub-motion vector. The first distance corresponding to the first motion vector with amplitude MV1 may be currPocDiffL1. The second distance corresponding to the sub-motion vector with amplitude MV0 may be currPocDiffL0.

Block S1030, the first sub-motion vector may be took as a starting point, and search may be performed by different motion combinations of the motion search amplitudes and the motion search directions, to obtain a first sub-motion vector offset of the first sub-motion direction under the different motion combinations.

For example, in a case of the sub-motion vector with amplitude MV0 and the sub-motion vector with amplitude MV1, when the quotient MV0/abs(currPocDiffL0) of the sub-motion vector with amplitude MV0 and the corresponding distance is greater than the quotient MV1/abs(currPocDiffL1) of the sub-motion vector with amplitude MV1 and the corresponding distance, and the sub-motion vector with the amplitude MV0 may be selected as the first sub-motion vector, the first sub-motion vector may be took as a starting point, and search may be performed by different motion combinations of the motion search amplitudes and the motion search directions, to obtain a first sub-motion vector offset MMDV0 of the first sub-motion direction under the different motion combinations.

For example, in a case of the sub-motion vector with amplitude MV0 and the sub-motion vector with amplitude MV1, when the quotient MV1/abs(currPocDiffL1) of the sub-motion vector with amplitude MV1 and the corresponding distance is greater than the quotient MV0/abs(currPocDiffL0) of the sub-motion vector with amplitude MV0 and the corresponding distance, and the sub-motion vector with the amplitude MV1 may be selected as the first sub-motion vector, the first sub-motion vector may be took as a starting point, and search may be performed by different motion combinations of the motion search amplitudes and the motion search directions, to obtain a first sub-motion vector offset MMDV1 of the first sub-motion direction under the different motion combinations.

Block S1040, an amplitude relationship between the second sub-motion vector and the first sub-motion vectors, and a distance relationship between the first distance and the second distance, may be acquired; and the second sub-motion vector offset of the second sub-motion direction corresponding to the motion combinations, may be determined based on the amplitude relationship, the distance relationship, and the first sub-motion vector offset under the different motion combinations.

The amplitude relationship may be a ratio of amplitudes, a positive correlation function such as amplitude logarithm and amplitude index. Similarly, the distance relationship may be a ratio of distances, or a positive correlation function such as distance logarithm and distance index, and it is not limited in this embodiment. In one of embodiments, the amplitude ratio between the second sub-motion vector and the first sub-motion vector and the ratio of the distance between the first distance and the second distance may be obtained. The product of the ratio of amplitude, the ratio of distance, and the first sub-motion vector offset under different motion combinations may be used as the second sub-motion vector offset of the second sub-motion direction in the corresponding motion combination.

For example, in a case of the sub-motion vector with amplitude MV0 and the sub-motion vector with amplitude MV1, when the quotient MV0/abs(currPocDiffL0) of the sub-motion vector with amplitude MV0 and the corresponding distance is greater than the quotient MV1/abs(currPocDiffL1) of the sub-motion vector with amplitude MV1 and the corresponding distance, and the sub-motion vector with the amplitude MV0 may be selected as the first sub-motion vector, and the first sub-motion vector may be took as a starting point, and search may be performed by different motion combinations of the motion search amplitudes and the motion search directions, to obtain a first sub-motion vector offset MMVD0=mmvdoffset of the first sub-motion direction under the different motion combinations, the amplitude ratio MV1/MV0 between the second sub-motion vector and the first sub-motion vector may be obtained, and the ratio of the first distance to the second distance currPocDiffL0/currPocDiffL1 may be obtained, and the product (MV1/MV0)*(currPocDiffL0/currPocDiffL1)*MMVD0 of the amplitude ratio MV1/MV0, the distance ratio currPocDiffL0/currPocDiffL1, and the first sub-motion vector offset MMVD0 under different motion combinations may be took as the second sub-motion vector offset MMVD1 of the second sub-motion direction in the corresponding motion combination, i.e., MMVD1=(MV1/MV0)*(currPocDiffL0/currPocDiffL1)*MMVD0.

For example, in a case of the sub-motion vector with amplitude MV0 and the sub-motion vector with amplitude MV1, when the quotient MV1/abs(currPocDiffL1) of the sub-motion vector with amplitude MV1 and the corresponding distance is greater than the quotient MV0/abs(currPocDiffL0) of the sub-motion vector with amplitude MV0 and the corresponding distance, and the sub-motion vector with the amplitude MV1 may be selected as the first sub-motion vector, and the first sub-motion vector may be took as a starting point, and search may be performed by different motion combinations of the motion search amplitudes and the motion search directions, to obtain a first sub-motion vector offset MMVD1=mmvdoffset of the first sub-motion direction under the different motion combinations, the amplitude ratio MV0/MV1 between the second sub-motion vector and the first sub-motion vector may be obtained, and the ratio of the first distance to the second distance currPocDiffL1/currPocDiffL0 may be obtained, and the product (MV0/MV1)*(currPocDiffL1/currPocDiffL0)*MMVD1 of the amplitude ratio MV0/MV1, the distance ratio currPocDiffL1/currPocDiffL0, and the first sub-motion vector offset MMVD1 under different motion combinations may be took as the second sub-motion vector offset MMVD0 of the second sub-motion direction in the corresponding motion combination, i.e., MMVD0=(MV0/MV1)*(currPocDiffL1/currPocDiffL0)*MMVD1.

Block S1050, the motion vector offset of the first candidate motion vectors under the corresponding motion combinations, may be composed by the first sub-motion vector offset and the second sub-motion vector offset of the first candidate motion vectors under the corresponding motion combination.

The motion vector offset of the first candidate motion vectors under the corresponding motion combinations, may be composed by the first sub-motion vector offset and the second sub-motion vector offset of the first candidate motion vectors under the corresponding motion combination.

In the embodiment of the second sub-aspect, expression of syntax element of the MMVD mode may include syntax element corresponding to a direction of the first sub-motion vector. The syntax element corresponding to the direction of the first sub-motion vector may include the first sub-motion vector offset or a motion search direction index in the motion combination corresponding to the first sub-motion vector offset.

Figure 11:
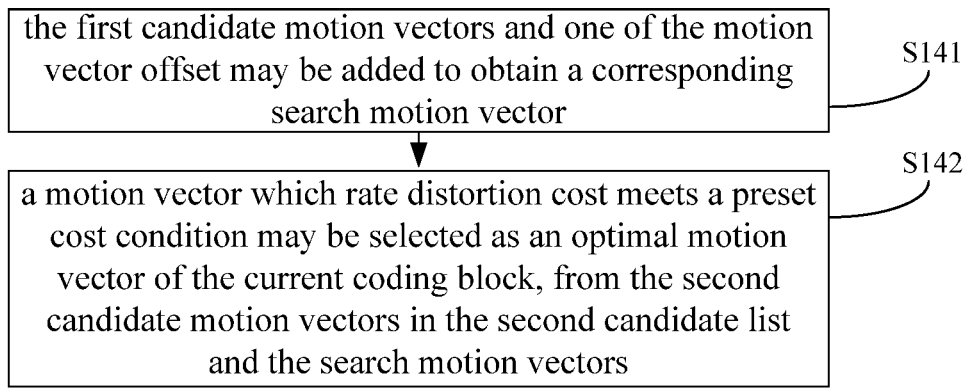
FIG. 11 is a flow chart of block S14 in accordance with an embodiment in FIG. 1.

Referring to FIG. 11, FIG. 11 is a flow chart of block S14 in accordance with an embodiment in FIG. 1. The block S14 may include operations in the following blocks.

Block S141, the first candidate motion vectors and one of the motion vector offset may be added to obtain a corresponding search motion vector.

The first candidate motion vectors and one of the motion vector offset may be added to obtain a corresponding search motion vector. For example, when one of the sub-motion vectors MV0 of the first candidate motion vector is (16, −16), and one of the motion vector offsets MMVD0 is (8, 8), the corresponding search motion vector MV3=MV0+MMVD0 may be (24, −8); or when another sub-motion vector MV1 of the first candidate motion vector is (−32, 40), and one of the motion vector offsets MMVD1 is (−64, −64), the corresponding search motion vector MV4=MV1+MMVD1 may be (−96, −24).

Block S142, a motion vector which rate distortion cost meets a preset cost condition may be selected as an optimal motion vector of the current coding block, from the second candidate motion vectors in the second candidate list and the search motion vectors.

The motion vector which rate distortion cost meets the preset cost condition may be selected as the optimal motion vector of the current coding block, from the second candidate motion vectors in the second candidate list and the search motion vectors.

Figure 12:
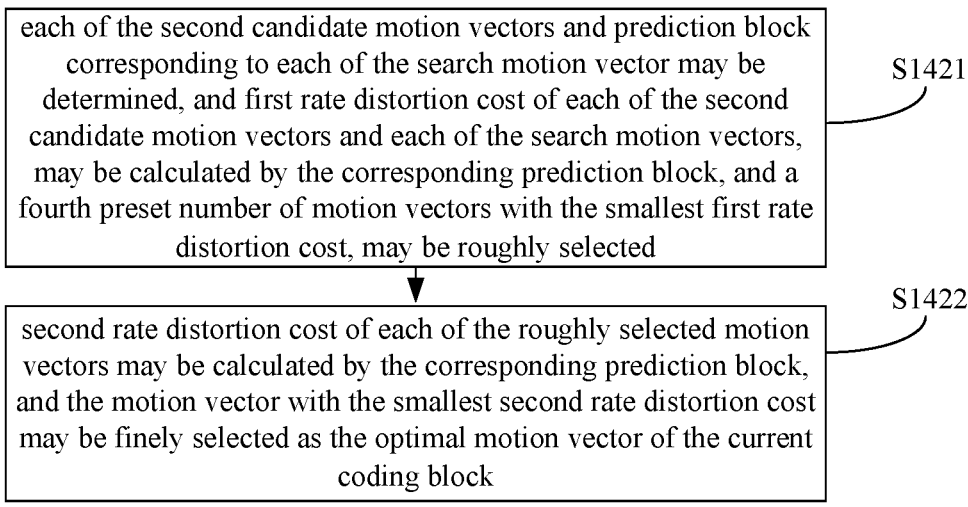
FIG. 12 is a flow chart of block S142 in accordance with an embodiment in FIG. 11.

In an implementation scenario, the above-mentioned preset cost condition may be that the rate distortion cost is the smallest. Referring to FIG. 12, the block S142 may include operations in the following blocks.

Block S1421, each of the second candidate motion vectors and prediction block corresponding to each of the search motion vector may be determined, and first rate distortion cost of each of the second candidate motion vectors and each of the search motion vectors, may be calculated by the corresponding prediction block, and a fourth preset number of motion vectors with the smallest first rate distortion cost, may be roughly selected.

In an implementation scenario, a low-complexity sum of absolute transformed difference (SATD) method may be used based on the determined second candidate motion vector and a set of search motion vectors, to obtain the first rate-distortion cost Rdcost of different motion vectors. Calculation can be referred to the following formula (2).

$$Rdcost = D + \lambda * R \qquad (2)$$

The D and the R may refer to distortion and a number of bits when using different motion vectors, and the λ is a Lagrangian factor.

Based on the first rate-distortion cost, the fourth preset number of motion vectors with the smallest first rate-distortion cost may be determined from the set of the second candidate motion vector and the search motion vector. In one implementation scenario, the fourth preset number may be 5, and in other implementation scenarios, the fourth preset number may not be limited to 5, such as 4, 6, and so on.

In another implementation scenario, the corresponding first rate distortion cost Rdcost may be also calculated based on the determined second candidate motion vector by the above-mentioned formula. Based on the calculated Rdcost, an Rdcost cost list including a fourth preset number of motion vectors and the second candidate motion vector corresponding to an index list in the second candidate list, may be is constructed. Then, the first rate-distortion cost Rdcost of the search motion vector may be calculated by the above-mentioned formula, and may be compared with the constructed Rdcost cost list one-by-one. Thereby the Rdcost list and the index list may be updated.

Both of the above-mentioned methods may roughly select the fourth preset number of motion vectors with the smallest first rate-distortion cost, and adoption from the above-mentioned methods is not limited in this embodiment.

Block S1422, second rate distortion cost of each of the roughly selected motion vectors may be calculated by the corresponding prediction block, and the motion vector with the smallest second rate distortion cost may be finely selected as the optimal motion vector of the current coding block.

In an implementation scenario, a more complex sum of squared error (SSE, i.e., sum of square of the difference) method may be used to calculate the second rate-distortion cost. The motion vector with the smallest second rate distortion cost may be selected as the optimal motion vector of the current coding block. The algorithm of SSE method may be the related art in the field, therefore no more descriptions are given in this embodiment.

In this embodiment, calculation complexity of the first rate-distortion cost may be lower than calculation complexity of the second rate-distortion cost. The fourth preset number may be an arbitrary natural number.

In the above-mentioned method, the fourth preset number of the motion vectors may be firstly selected and obtained with low calculation complexity. The optimal motion vector may be selected and obtained with high calculation complexity. Thereby, calculation complexity of obtaining the optimal motion vector may be reduced to a certain extent, and processing load may be reduced.

The Second Aspect

Figure 13:
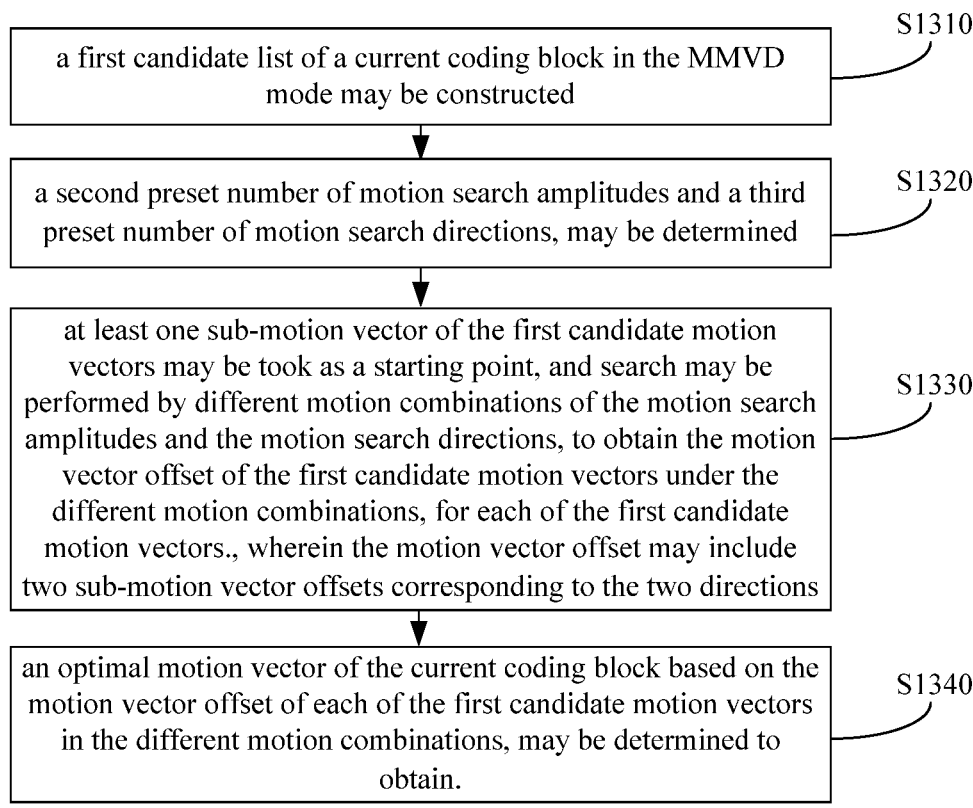
FIG. 13 is a flow chart of an inter-frame prediction method based on a MMVD mode in accordance with an embodiment in the present disclosure.
Figure 14:
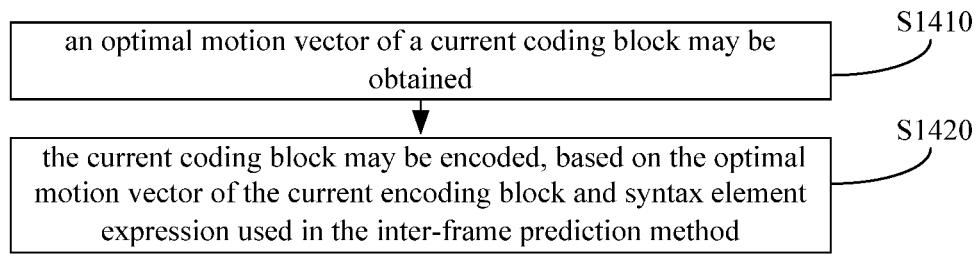
FIG. 14 is a flow chart of a video coding method in accordance with an embodiment in the present disclosure.

When a frame which the current coding block located is a B-frame, the optimal motion vector may also be obtained by the following operations to improve the accuracy of obtaining the optimal motion vector. Thereby the accuracy of inter-frame prediction may be improved. Refer to FIG. 13, for details, and the method may include operations in the following blocks.

Block S1310, a first candidate list of a current coding block in the MMVD mode may be constructed.

The first candidate list may include a first preset number of first candidate motion vectors. The first candidate motion vector may include two sub-motion vectors corresponding to two directions respectively. In an implementation scenario, the directions of two sub-motion vectors included in the first candidate motion vector may be forward and backward respectively. In an implementation scenario, the directions of two sub-motion vectors included in the first candidate motion vector may be forward and forward respectively. In an implementation scenario, the directions of two sub-motion vectors included in the first candidate motion vector may be backward and backward respectively. It is not be limited in this embodiment.

In an implementation scenario, the first candidate list may specifically be constructed based on the motion vector candidate list constructed in a preset inter-frame prediction mode. In this embodiment, the preset inter-frame prediction mode may include but may be not limited to merge mode and AMVP mode. The motion vector candidate list constructed in the merge mode and the AMVP mode, may refer to the above-mentioned implementation, therefore no more descriptions are given herein.

The first preset number may be an integer. In an implementation scenario, in order to further increase the number of first candidate motion vectors, the first preset number may be specifically set to be greater than 2, such as 3, 4, 5, and so on.

In addition, several second candidate motion vectors selected from the second candidate list may include a spatial candidate motion vector and a temporal candidate motion vector, so that the constructed first candidate list may include a spatial candidate motion vector and a temporal candidate motion vector.

Details may refer to the block S11 in the embodiments of the above-mentioned first aspect. In addition, the operations for constructing the first candidate list of the current coding block in the MMVD mode may refer to the block S111 to the block S112 in the embodiments of the above-mentioned first aspect, therefore no more descriptions are given herein.

Block S1320, a second preset number of motion search amplitudes and a third preset number of motion search directions, may be determined.

In an implementation scenario, in order to facilitate subsequent video encoding, a second preset number of the motion search amplitudes may also be obtained to construct an amplitude list, in which each motion search amplitudes corresponds to an index value.

Details may refer to the block S12 in the embodiments of the above-mentioned first aspect. In addition, in order to facilitate subsequent video encoding, the third present number of the motion search directions may also be obtained to construct a direction list. Each of the motion search directions in the direction list may correspond to an index value. Details may refer to the block S121 to the block S123 in the embodiments of the above-mentioned first aspect, therefore no more descriptions are given in this embodiment.

Block S1330, at least one sub-motion vector of the first candidate motion vectors may be took as a starting point, and search may be performed by different motion combinations of the motion search amplitudes and the motion search directions, to obtain the motion vector offset of the first candidate motion vectors under the different motion combinations, for each of the first candidate motion vectors, wherein the motion vector offset may include two sub-motion vector offsets corresponding to the two directions.

In an implementation scenario, two sub-motion vector of the first candidate motion vectors may be took respectively as a starting point, and search may be performed by different motion combinations of the motion search amplitudes and the motion search directions, to obtain respectively two sub-motion vector offsets of the two sub-motion vectors under the different motion combinations. Since a process that the two sub-motion vectors obtain the respective sub-motion vector offsets are independent and uncorrelated, the motion vector offsets of the first candidate motion vector in different combinations may be obtained through free combination. Details may refer to the related description of the first sub-aspect in the above-mentioned embodiment of the first aspect, which is not repeated in this embodiment, therefore no more descriptions are given in this embodiment.

In an implementation scenario, one sub-motion vector of the first candidate motion vectors may also be took as a starting point, and search may be performed by different motion combinations of the motion search amplitudes and the motion search directions, to obtain a sub-motion vector offset of the sub-motion vector under the different motion combinations. Therefore, the sub-motion vector offset of another sub-motion vector may be obtained by deriving, and the motion vector offset under different combinations of the first candidate motion vector may be obtained through the corresponding motion combination. Details may refer to the related description of the second sub-aspect in the above-mentioned embodiment of the first aspect, which is not repeated in this embodiment, therefore no more descriptions are given in this embodiment.

Both of the above-mentioned methods may obtain the motion vector offset of the first candidate motion vector under different motion combinations, and adoption from the above-mentioned methods is not limited in this embodiment.

Block S1340, an optimal motion vector of the current coding block based on the motion vector offset of each of the first candidate motion vectors in the different motion combinations, may be determined to obtain.

Details may refer to the block S14 in the embodiments of the above-mentioned first aspect, and may refer to the block S141 to the block S142 and the block S1421 to the block S1422 in the embodiments of the above-mentioned first aspect, therefore no more descriptions are given in this embodiment.

The Third Aspect

Referring to FIG. 13, FIG. 13 is a flow chart of an inter-frame prediction method based on a MMVD mode in accordance with an embodiment in the present disclosure. The method may include operations in the following blocks.

Block S1410, an optimal motion vector of a current coding block may be obtained.

The optimal motion vector of the current coding block may be obtained by the operations of the embodiment of the above-mentioned first aspect, or obtained by the operations of the embodiment of the above-mentioned second aspect.

Block S1420, the current coding block may be encoded, based on the optimal motion vector of the current encoding block and syntax element expression used in the inter-frame prediction method.

The current coding block may be encoded, based on the optimal motion vector of the current encoding block and syntax element expression used in the inter-frame prediction method.

In the above-mentioned embodiment, a search range may be expanded to a certain extent, a number of pixel blocks obtained through the search may be increased, and then the optimal motion vector of the current coding block may be determined based on the motion vector offset of the pixel block obtained by the search. Since the number of searched pixel blocks increases, the accuracy of the determined optimal motion vector may be correspondingly improved, thereby the accuracy of inter-frame prediction may be improved.

In addition, when the index value of the motion search direction used by the first candidate motion vector is related to the corresponding first candidate motion vector, since a probability that the motion search direction related to the first candidate motion vector is finally the motion search direction corresponding to the best motion vector of the current coding block, is higher, the index that the motion search direction is the optimal motion vector of the current coding block with a higher probability, may be set smaller. The index that the motion search direction is the optimal motion vector of the current coding block with a higher probability, may be a smaller value. Thus, the number of coding bits as the index value of the motion search direction of the optimal motion vector may be reduced. The amount of code stream data for subsequent video encoding may be reduced, the encoding compression rate may be increased, and the transmission bandwidth of video data and the storage resources of video data may be reduced.

Figure 15:
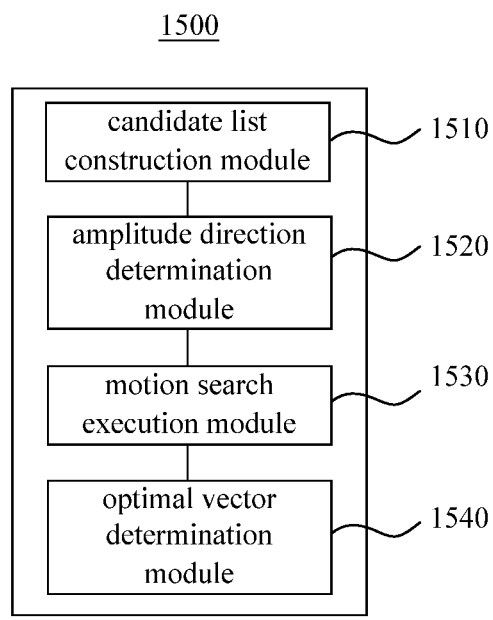
FIG. 15 is a block illustration of an inter-frame prediction device based on a MMVD mode in accordance with an embodiment in the present disclosure.

Referring to FIG. 15, FIG. 15 is a block illustration of an inter-frame prediction device based on a MMVD mode in accordance with an embodiment in the present disclosure. The inter-frame prediction device based on a MMVD mode 1500 may include a candidate list construction module 1510, an amplitude direction determination module 1520, a motion search execution module 1530, and an optimal vector determination module 1540. The candidate list construction module 1510 may be configured to construct a first candidate list of a current coding block in the MMVD mode, wherein the first candidate list includes a first preset number of first candidate motion vectors. The amplitude direction determination module 1520 may be configured to determine a second preset number of motion search amplitudes and a third preset number of motion search directions. The motion search execution module 1530 may be configured to take the first candidate motion vector as a starting point, and search by different motion combinations of the motion search amplitudes and the motion search directions, to obtain a motion vector offset of the first candidate motion vector under the different motion combinations, for each of the first candidate motion vectors. The optimal vector determination module 1540 may be configured to determine to obtain an optimal motion vector of the current coding block based on the motion vector offset of each of the first candidate motion vectors in the different motion combinations. The first preset number, the second preset number, and the third preset number may be integers. The first preset number, the second preset number, and the third preset number may be satisfied at least one of the following: the first preset number being greater than 2, the second preset number being greater than 6, the third preset number being greater than 4, and an index value of the motion search direction used by the first candidate motion vectors being related to the corresponding first candidate motion vectors.

In this embodiment, by constructing a first candidate list of a current coding block in the MMVD mode; determining a second preset number of motion search amplitudes and a third preset number of motion search directions; taking the first candidate motion vector as a starting point, and searching by different motion combinations of the motion search amplitudes and the motion search directions, to obtain a motion vector offset of the first candidate motion vector under the different motion combinations, for each of the first candidate motion vectors; determining to obtain an optimal motion vector of the current coding block based on the motion vector offset of each of the first candidate motion vectors in the different motion combinations. Therefore, a search range may be expanded to a certain extent, a number of motion vector offsets may be increased. Furthermore, based on the numerous motion vector offsets of each first candidate motion vector in different motion combinations, it may be helpful to determine an optimal motion vector of the current coding block, and the accuracy of the acquired motion vector may be improved, to improve the accuracy of inter-frame prediction.

In addition, at least one of the following: the first preset number being greater than 2, the second preset number being greater than 6, the third preset number being greater than 4, and an index value of the motion search direction used by the first candidate motion vectors being related to the corresponding first candidate motion vectors, may be satisfied. When the first preset number being greater than 2, the second preset number being greater than 6, the third preset number being greater than 4, is may satisfied, a motion search range may be further expanded. It may beneficial to further select the optimal motion vector of the current coding block, and further improve the accuracy of the obtained motion vector, and improve the accuracy of inter-frame prediction. When the index value of the motion search direction used by the first candidate motion vectors being related to the corresponding first candidate motion vectors, is satisfied, higher probability may be took as the motion search direction corresponding to the optimal motion vector of the current coding block to preferentially obtain the motion search direction as the first candidate motion vector. Therefore, a number of coding bits as the index value of the motion search direction of the optimal motion vector may be reduced. The amount of code stream data for subsequent video encoding may be reduced, the encoding compression rate may be increased, and the transmission bandwidth of video data and the storage resources of video data may be reduced.

In some embodiment, the amplitude direction determination module 1520 may be configured to acquire the second preset number of the motion search amplitudes to construct an amplitude list, and acquire a third preset number of the motion search directions to construct at least one direction list.

In some embodiment, the motion search execution module 1530 may be configured to take the first candidate motion vector as a starting point, and search by different motion combinations of the motion search amplitudes and the motion search directions, to obtain a motion vector offset of the first candidate motion vector under the different motion combinations, for each of the first candidate motion vectors.

In some embodiments, each first candidate motion vector may correspond to a direction list. The amplitude direction determination module 1520 may be configured to acquire the third preset number of the motion search directions; determine an index of the third preset number of the motion search directions, by a degree of relation between each of the motion search directions and the first candidate motion vectors.

When the index in the direction list of the motion search direction that is more related to the second candidate motion vector is smaller, the third preset number of motion search directions and their indexes may be used to construct the direction list corresponding to the first candidate motion vector. The direction list used when the motion search is performed with the first candidate motion vector as the starting point, may be the direction list of the first candidate motion vector.

In some embodiments, the second preset number and the third preset number may be both 8. The second preset number of the motion search amplitudes may include ⅛ pixel, ¼ pixel, ½ pixel, 1 pixel, 2 pixels, 4 pixels, 8 pixels, 16 pixels. The third preset number of the motion search directions may include right, left, bottom, top, bottom right, bottom left, top right, and top left.

In some embodiments, the candidate list construction module 1510 may include a list acquisition module. The list acquisition module may be configured to acquire a second candidate list of the current coding block. The second candidate list may be constructed in a preset inter-frame prediction mode and includes a number of second candidate motion vectors. The candidate list construction module 1510 may further include a list construction module. The list construction module may be configured to select sequentially the first preset number of second candidate motion vectors from the second candidate list to serve as the first candidate motion vectors in the first candidate list.

In some embodiments, the optimal vector determination module 1540 may include a search motion vector acquisition module. The search motion vector acquisition module may be configured to add the first candidate motion vectors and one of the motion vector offset to obtain a corresponding search motion vector. The optimal vector determination module 1540 may further include a motion vector selection module. The motion vector selection module may be configured to select a motion vector which rate distortion cost meets a preset cost condition as an optimal motion vector of the current coding block, from the second candidate motion vectors in the second candidate list and the search motion vectors.

In some embodiments, the preset cost condition may be that the rate distortion cost is the smallest. The motion vector selection module may be configured to determine each of the second candidate motion vectors and prediction block corresponding to each of the search motion vector, and calculating first rate distortion cost of each of the second candidate motion vectors and each of the search motion vectors, by the corresponding prediction block, roughly select a fourth preset number of motion vectors with the smallest first rate distortion cost, calculate second rate distortion cost of each of the roughly selected motion vectors by the corresponding prediction block, and finely select the motion vector with the smallest second rate distortion cost as the optimal motion vector of the current coding block. Calculation complexity of the first rate-distortion cost may be lower than calculation complexity of the second rate-distortion cost. The fourth preset number may be an arbitrary natural number.

In some embodiments, the first candidate list may include a spatial candidate motion vector and a temporal candidate motion vector. The preset inter-frame prediction modes may include the merge mode and the AMVP mode.

In some embodiments, the first candidate motion vector may include two sub-motion vectors corresponding to two directions respectively. When a current frame which the current coding block located is a B-frame, the motion search execution module 1530 may be configured to take at least one sub-motion vector of the first candidate motion vectors as a starting point, and searching by different motion combinations of the motion search amplitudes and the motion search directions, to obtain the motion vector offset of the first candidate motion vectors under the different motion combinations. The motion vector offset may include two sub-motion vector offsets corresponding to the two directions.

In some embodiments, the motion search execution module 1530 may be configured to take a first sub-motion vector of the first candidate motion vectors as a starting point, and search by different motion combinations of the motion search amplitudes and the motion search directions, to obtain a first sub-motion vector offset of the first candidate motion vectors under the different motion combinations; take a second sub-motion vector of the first candidate motion vectors as a starting point, and search by different motion combinations of the motion search amplitudes and the motion search directions, to obtain a second sub-motion vector offset of the first candidate motion vector under the different motion combinations; compose the motion vector offset of the first candidate motion vectors under the different motion combinations, by the first sub-motion vector offset under the different motion combinations and the second sub-motion vector offset. Expression of syntax element of the MMVD mode may include syntax elements in two directions of the first candidate motion vectors. The syntax element of each direction may include the motion vector offset, or a motion search direction index in the motion combinations corresponding to the motion vector offset.

In some embodiments, the motion search execution module 1530 may be configured to acquire amplitudes of a first sub-motion vector and a second sub-motion vector of the first candidate motion vectors; select a first sub-motion vector with an amplitude meeting a preset amplitude condition, from the first sub-motion vector and the second sub-motion vector; take the first sub-motion vector as a starting point, and search by different motion combinations of the motion search amplitudes and the motion search directions, to obtain a first sub-motion vector offset of the first sub-motion direction under the different motion combinations; obtain a second sub-motion vector offset of the second sub-motion direction under the corresponding different motion combinations, by the first sub-motion vector offset of the first sub-motion vector under the different motion combinations; compose the motion vector offset of the first candidate motion vectors under the corresponding motion combinations, by the first sub-motion vector offset and the second sub-motion vector offset of the first candidate motion vectors under the corresponding motion combination. Expression of syntax element of the MMVD mode may include syntax element corresponding to a direction of the first sub-motion vector. The syntax element corresponding to the direction of the first sub-motion vector may include the first sub-motion vector offset or a motion search direction index in the motion combination corresponding to the first sub-motion vector offset.

In some embodiments, the preset amplitude condition may be that which one of an amplitude of the first sub-motion vector and an amplitude of the second sub-motion vector is greater or equal. The motion search execution module 1530 may be configured to acquire an amplitude relationship between the second sub-motion vector and the first sub-motion vectors; and determine the second sub-motion vector offset of the second sub-motion direction corresponding to the motion combinations, based on the amplitude relationship and the first sub-motion vector offset in the different motion combinations. The preset amplitude condition may be that which one of quotient of the amplitude of the first sub-motion vector and corresponding distance and quotient of the amplitude of the second sub-motion vector and corresponding distance is greater or equal. The corresponding distance of the first sub-motion vector may be first distance between a first reference frame corresponding to the first sub-motion vector and the current frame. The corresponding distance of the second sub-motion vector may be second distance between a second reference frame corresponding to the second sub-motion vector and the current frame. The motion search execution module 1530 may be further configured to acquire an amplitude relationship between the second sub-motion vector and the first sub-motion vectors, and a distance relationship between the first distance and the second distance; and determine the second sub-motion vector offset of the second sub-motion direction corresponding to the motion combinations, based on the amplitude relationship, the distance relationship, and the first sub-motion vector offset under the different motion combinations.

Figure 16:
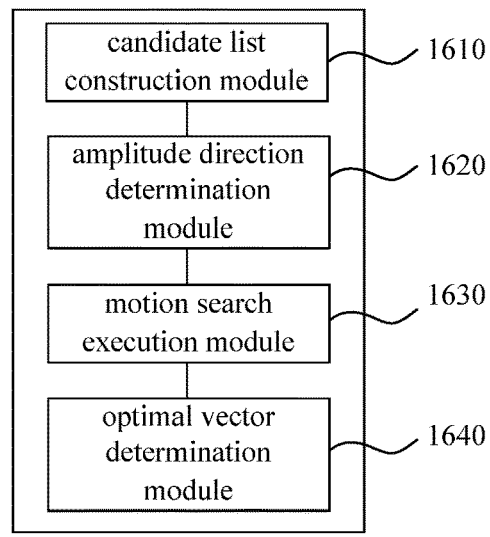
FIG. 16 is a block illustration of an inter-frame prediction device based on a MMVD mode in accordance with an embodiment in the present disclosure.

Referring to FIG. 16, FIG. 16 is a block illustration of an inter-frame prediction device based on a MMVD mode in accordance with an embodiment in the present disclosure. The inter-frame prediction device based on a MMVD mode 1600 may include a candidate list construction module 1610, an amplitude direction determination module 1620, a motion search execution module 1630, and an optimal vector determination module 1640. The candidate list construction module 1610 may be configured to construct a first candidate list of a current coding block in the MMVD mode. The first candidate list may include a first preset number of first candidate motion vectors. The first candidate motion vectors may include two sub-motion vectors corresponding to two directions respectively. The amplitude direction determination module 1620 may be configured to determine a second preset number of motion search amplitudes and a third preset number of motion search directions. The motion search execution module 1630 may be configured to take at least one sub-motion vector of the first candidate motion vectors as a starting point, and search by different motion combinations of the motion search amplitudes and the motion search directions, to obtain the motion vector offset of the first candidate motion vectors under the different motion combinations, for each of the first candidate motion vectors. The motion vector offset may include two sub-motion vector offsets corresponding to the two directions. The optimal vector determination module 1640 may be configured to determine to obtain an optimal motion vector of the current coding block based on the motion vector offset of each of the first candidate motion vectors in the different motion combinations.

In the above-mentioned method, a search range may be expanded to a certain extent, a number of motion vector offsets may be increased. Based on the many motion vector offsets of each first candidate motion vector under different motion combinations, the optimal motion vector of the current coding block may be determined. The accuracy of the obtained motion vector may be improved. The accuracy of inter-frame prediction may be improved.

In some embodiments, the motion search execution module 1630 may be configured to take a first sub-motion vector of the first candidate motion vectors as a starting point, and search by different motion combinations of the motion search amplitudes and the motion search directions, to obtain a first sub-motion vector offset of the first candidate motion vectors under the different motion combinations; take a second sub-motion vector of the first candidate motion vectors as a starting point, and search by different motion combinations of the motion search amplitudes and the motion search directions, to obtain a second sub-motion vector offset of the first candidate motion vector under the different motion combinations; compose the motion vector offset of the first candidate motion vectors under the different motion combinations, by the first sub-motion vector offset under the different motion combinations and the second sub-motion vector offset. Expression of syntax element of the MMVD mode may include syntax elements in two directions of the first candidate motion vectors. The syntax element of each direction may include the motion vector offset, or a motion search direction index in the motion combinations corresponding to the motion vector offset. The motion search execution module 1630 may be further configured to compose a number N of motion vector offsets of the first candidate motion vectors under different motion combinations, by different combinations of the first sub-motion vector offset under each motion combinations and the second sub-motion vector offset under each motion combinations. The number N may be equal to a square of a product of a second predetermined number J and a third predetermined number K.

In some embodiments, the motion search execution module 1630 may be configured to acquire amplitudes of a first sub-motion vector and a second sub-motion vector of the first candidate motion vectors; select a first sub-motion vector with an amplitude meeting a preset amplitude condition, from the first sub-motion vector and the second sub-motion vector; take the first sub-motion vector as a starting point, and search by different motion combinations of the motion search amplitudes and the motion search directions, to obtain a first sub-motion vector offset of the first sub-motion direction under the different motion combinations; obtain a second sub-motion vector offset of the second sub-motion direction under the corresponding different motion combinations, by the first sub-motion vector offset of the first sub-motion vector under the different motion combinations; compose the motion vector offset of the first candidate motion vectors under the corresponding motion combinations, by the first sub-motion vector offset and the second sub-motion vector offset of the first candidate motion vectors under the corresponding motion combination. Expression of syntax element of the MMVD mode may include syntax element corresponding to a direction of the first sub-motion vector. The syntax element corresponding to the direction of the first sub-motion vector may include the first sub-motion vector offset or a motion search direction index in the motion combination corresponding to the first sub-motion vector offset.

The preset amplitude condition may be that which one of an amplitude of the first sub-motion vector and an amplitude of the second sub-motion vector is greater or equal. The motion search execution module 1630 may be further configured to acquire an amplitude relationship between the second sub-motion vector and the first sub-motion vectors; and determine the second sub-motion vector offset of the second sub-motion direction corresponding to the motion combinations, based on the amplitude relationship and the first sub-motion vector offset in the different motion combinations. The preset amplitude condition may be that which one of quotient of the amplitude of the first sub-motion vector and corresponding distance and quotient of the amplitude of the second sub-motion vector and corresponding distance is greater or equal. The corresponding distance of the first sub-motion vector may be first distance between a first reference frame corresponding to the first sub-motion vector and the current frame. The corresponding distance of the second sub-motion vector may be second distance between a second reference frame corresponding to the second sub-motion vector and the current frame. The motion search execution module 1630 may be further configured to acquire an amplitude relationship between the second sub-motion vector and the first sub-motion vectors, and a distance relationship between the first distance and the second distance; and determine the second sub-motion vector offset of the second sub-motion direction corresponding to the motion combinations, based on the amplitude relationship, the distance relationship, and the first sub-motion vector offset under the different motion combinations.

In some embodiments, the candidate list construction module 1610 may include a list acquisition module. The list acquisition module may be configured to acquire a second candidate list of the current coding block. The second candidate list may be constructed in a preset inter-frame prediction mode and includes a number of second candidate motion vectors. The candidate list construction module 1610 may further include a list construction module. The list construction module may be configured to select sequentially the first preset number of second candidate motion vectors from the second candidate list to serve as the first candidate motion vectors in the first candidate list.

In some embodiments, the optimal vector determination module 1540 may include a search motion vector acquisition module. The search motion vector acquisition module may be configured to add the first candidate motion vectors and one of the motion vector offset to obtain a corresponding search motion vector. The optimal vector determination module 1540 may further include a motion vector selection module. The motion vector selection module may be configured to select a motion vector which rate distortion cost meets a preset cost condition as an optimal motion vector of the current coding block, from the second candidate motion vectors in the second candidate list and the search motion vectors. The first candidate list may include a spatial candidate motion vector and a temporal candidate motion vector. The preset inter-frame prediction modes may include the merge mode and the AMVP mode.

Figure 17:
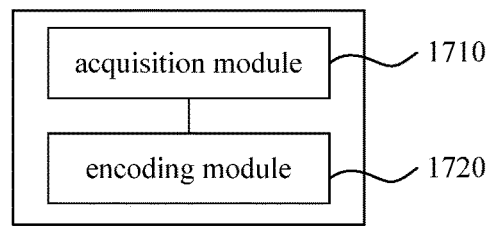
FIG. 17 is a block illustration of a video coding device in accordance with an embodiment in the present disclosure.

Referring to FIG. 17, FIG. 17 is a block illustration of a video coding device in accordance with an embodiment in the present disclosure. The video encoding device 1700 may include an acquisition module 1710 and an encoding module 1720. The acquisition module 1710 may be configured to obtain an optimal motion vector of a current coding block. The optimal motion vector of the current coding block may be obtained by the above-mentioned inter-frame prediction device based on a MMVD mode 1500 or the above-mentioned inter-frame prediction device based on a MMVD mode 1600. The encoding module 1720 may be configured to encode the current coding block based on the optimal motion vector of the current encoding block and syntax element expression used in the inter-frame prediction method.

In the above-mentioned embodiment, a search range may be expanded to a certain extent, a number of pixel blocks obtained through the search may be increased, and then the optimal motion vector of the current coding block may be determined based on the motion vector offset of the pixel block obtained by the search. Since the number of searched pixel blocks increases, the accuracy of the determined optimal motion vector may be correspondingly improved, thereby the accuracy of inter prediction may be improved.

In addition, when the index value of the motion search direction used by the first candidate motion vector is related to the corresponding first candidate motion vector, since a probability that the motion search direction related to the first candidate motion vector is finally the motion search direction corresponding to the best motion vector of the current coding block, is higher, the index that the motion search direction is the optimal motion vector of the current coding block with a higher probability, may be set smaller. The index that the motion search direction is the optimal motion vector of the current coding block with a higher probability, may be a smaller value. Thus, the number of coding bits as the index value of the motion search direction of the optimal motion vector may be reduced. The amount of code stream data for subsequent video encoding may be reduced, the encoding compression rate may be increased, and the transmission bandwidth of video data and the storage resources of video data may be reduced.

Figure 18:
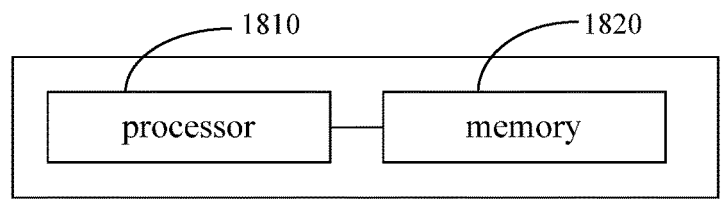
FIG. 18 is a block illustration of an inter-frame prediction apparatus based on a MMVD mode in accordance with an embodiment in the present disclosure.

Referring to FIG. 18, FIG. 18 is a block illustration of an inter-frame prediction apparatus based on a MMVD mode in accordance with an embodiment in the present disclosure. The inter-frame prediction apparatus 1810 based on a MMVD mode may include a processor 1810 and a memory 1820 coupled to each other. The memory 1820 may be configured to store a program. The processor 1810 may be configured to execute the program to implement the operations in any embodiment of the inter-frame prediction method in the above-mentioned first aspect.

The processor 1810 may be configured to itself and the memory 1820 to implement the operations in any embodiment of the inter-frame prediction method in the above-mentioned first aspect. The processor 1810 may also be called a central processing unit (CPU). The processor 1810 may be an integrated circuit chip with signal processing capabilities. The processor 1810 may also be a general-purpose processor, a digital signal processor (DSP), an application specific integrated circuit (ASIC), a field-programmable gate array (FPGA) or other programmable logic devices, discrete gates or transistor logic devices, discrete hardware components. The general-purpose processor may be a micro-processor, or the processor may also be any conventional processor or the like. In addition, the processor 1810 may be implemented by multiple integrated circuit chips.

In the above-mentioned embodiment, a search range may be expanded to a certain extent, a number of pixel blocks obtained through the search may be increased, and then the optimal motion vector of the current coding block may be determined based on the motion vector offset of the pixel block obtained by the search. Since the number of searched pixel blocks increases, the accuracy of the determined optimal motion vector may be correspondingly improved, thereby the accuracy of inter prediction may be improved.

In addition, when the index value of the motion search direction used by the first candidate motion vector is related to the corresponding first candidate motion vector, since a probability that the motion search direction related to the first candidate motion vector is finally the motion search direction corresponding to the best motion vector of the current coding block, is higher, the index that the motion search direction is the optimal motion vector of the current coding block with a higher probability, may be set smaller. The index that the motion search direction is the optimal motion vector of the current coding block with a higher probability, may be a smaller value. Thus, the number of coding bits as the index value of the motion search direction of the optimal motion vector may be reduced. The amount of code stream data for subsequent video encoding may be reduced, the encoding compression rate may be increased, and the transmission bandwidth of video data and the storage resources of video data may be reduced.

Figure 19:
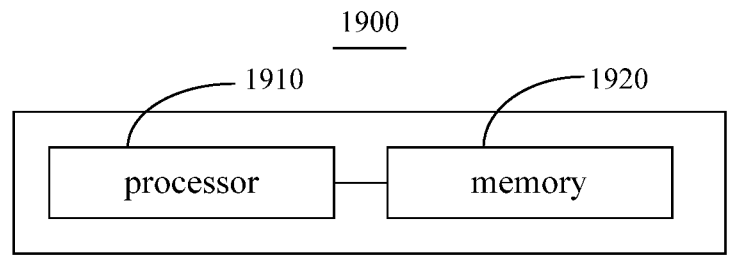
FIG. 19 is a block illustration of an inter-frame prediction apparatus based on a MMVD mode in accordance with an embodiment in the present disclosure.

Referring to FIG. 19, FIG. 19 is a block illustration of an inter-frame prediction apparatus based on a MMVD mode in accordance with an embodiment in the present disclosure. The inter-frame prediction apparatus 1910 based on a MMVD mode may include a processor 1910 and a memory 1920 coupled to each other. The memory 1920 may be configured to store a program. The processor 1910 may be configured to execute the program to implement the operations in any embodiment of the inter-frame prediction method in the above-mentioned second aspect.

The processor 1910 may be configured to itself and the memory 1920 to implement the operations in any embodiment of the inter-frame prediction method in the above-mentioned second aspect. The processor 1910 may also be called a central processing unit (CPU). The processor 1910 may be an integrated circuit chip with signal processing capabilities. The processor 1910 may also be a general-purpose processor, a digital signal processor (DSP), an application specific integrated circuit (ASIC), a field-programmable gate array (FPGA) or other programmable logic devices, discrete gates or transistor logic devices, discrete hardware components. The general-purpose processor may be a micro-processor, or the processor may also be any conventional processor or the like. In addition, the processor 1910 may be implemented by multiple integrated circuit chips.

The above-mentioned embodiment may improve the accuracy of the determined optimal motion vector to a certain extent, and it may be beneficial to improve the accuracy of inter-frame prediction.

Figure 20:
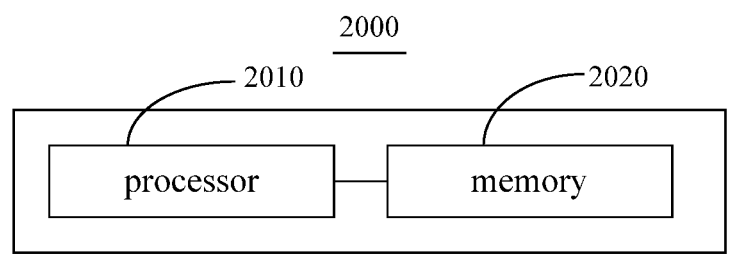
FIG. 20 is a block illustration of a video coding apparatus in accordance with an embodiment in the present disclosure.

Referring to FIG. 20, FIG. 20 is a block illustration of a video coding apparatus in accordance with an embodiment in the present disclosure. The video coding apparatus 2000 may include a processor 2010 and a memory 2020 coupled to each other. The memory 2020 may be configured to store a program. The processor 2010 may be configured to execute the program to implement the operations in any embodiment of the inter-frame prediction method in the above-mentioned third aspect.

The processor 2010 may be configured to itself and the memory 2020 to implement the operations in any embodiment of the inter-frame prediction method in the above-mentioned third aspect. The processor 2010 may also be called a central processing unit (CPU). The processor 2010 may be an integrated circuit chip with signal processing capabilities. The processor 2010 may also be a general-purpose processor, a digital signal processor (DSP), an application specific integrated circuit (ASIC), a field-programmable gate array (FPGA) or other programmable logic devices, discrete gates or transistor logic devices, discrete hardware components. The general-purpose processor may be a micro-processor, or the processor may also be any conventional processor or the like. In addition, the processor 1910 may be implemented by multiple integrated circuit chips.

The above-mentioned embodiment may improve the accuracy of the determined optimal motion vector to a certain extent, and it may be beneficial to improve the accuracy of inter-frame prediction.

Figure 21:
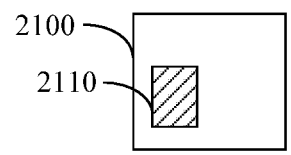
FIG. 21 is a block illustration of a storage apparatus in accordance with an embodiment in the present disclosure.

Referring to FIG. 21, FIG. 21 is a block illustration of a storage apparatus in accordance with an embodiment in the present disclosure. The storage apparatus in this embodiment of the present disclosure may store a program 2110. The program 2110 may be configured to be executed to implement the above-mentioned inter-frame prediction method. When the program 2110 is executed, the operations in the above-mentioned embodiment of the first aspect, or the operations in the above-mentioned embodiment of the second aspect, or the operations in the above-mentioned embodiment of the third aspect, may be implemented.

The program 2110 may be stored in the above-mentioned storage apparatus in a form of a software product, and may include a number of instructions to make a computer device (may be a personal computer, a server, or a network device, and so on) or a processor to execute all or a part of the operations of the methods described in the various embodiments of the present disclosure. The above-mentioned storage apparatus may include an USB flash disk, a mobile hard disk, a read-only memory (ROM), a random access memory (RAM), a hard disk, an optical disk, or other media that may store program codes. The above-mentioned storage apparatus may include a terminal device such as a computer, a server, a mobile phone, and a tablet.

The above-mentioned embodiment may improve the accuracy of the determined optimal motion vector to a certain extent, and it may be beneficial to improve the accuracy of inter-frame prediction.

In the several embodiments provided in the present disclosure, it should be understood that the disclosed system, device, and method may be implemented in other ways. For example, the above-mentioned device embodiments may be only illustrative. For example, the division of units may be only a logical function division, and there may be other divisions in actual implementation. For example, multiple units or components may be combined or integrated into another system. Some features may be ignored or not implemented. In addition, the displayed or discussed mutual coupling or direct coupling or communication connection may be indirect coupling or communication connection through some interfaces, devices or units, and may be in electrical, mechanical or other forms.

In addition, the functional units in the various embodiments of the present disclosure may be integrated into one processing unit, or each unit may exist alone physically, or two or more units may be integrated into one unit. The above-mentioned integrated unit may be implemented in a form of hardware or a software functional unit. The above are only implementations of the present disclosure, and do not limit the scope of the present disclosure. Any equivalent structure or equivalent process transformation made by the description and drawings of the present disclosure, or directly or indirectly applied to other related technical fields, are similarly included in the scope of patent protection of the present disclosure.

What is claimed is:

1. An inter-frame prediction method based on a merge with motion vector difference (MMVD) mode, comprising:
   constructing a first candidate list of a current coding block in the MMVD mode, wherein the first candidate list comprises a first preset number of first candidate motion vectors (MVs);
   determining a second preset number of motion search amplitudes and a third preset number of motion search directions;
   taking each of the first preset number of first candidate MVs as a starting point, and searching by different motion combinations of the motion search amplitudes and the motion search directions, to obtain a MV offset of each first candidate MV under the different motion combinations;
   determining to obtain an optimal MV of the current coding block based on the MV offset of each of the first candidate MVs in the different motion combinations;
   wherein, the first preset number, the second preset number, and the third preset number are integers; and the first preset number, the second preset number, and the third preset number are satisfied at least one of the following: the first preset number being greater than 2, the second preset number being greater than 6, the third preset number being greater than 4, and an index value of the motion search direction used by the first candidate MVs being related to the corresponding first candidate MVs; and
   for each of the first candidate MVs, the more the motion search direction is related to the first candidate MV, the smaller the index value of the motion search direction is.

2. The method of claim 1, wherein the determining the second preset number of the motion search amplitudes and the third preset number of the motion search directions, comprises:
   acquiring the second preset number of the motion search amplitudes to construct an amplitude list, and acquiring a third preset number of the motion search directions to construct at least one direction list;
   wherein the taking the first candidate MV as the starting point, and searching by the different motion combinations of the motion search amplitudes and the motion search directions, to obtain the MV offset of the first candidate MV under the different motion combinations, comprises:
   taking the first candidate MVs as a starting point, and searching by the different motion combinations of the motion search amplitudes and the motion search directions, to obtain the MV offset of the first candidate MVs under the different motion combinations, based on the amplitude list and the direction list.

3. The method of claim 2, wherein each of the first candidate MVs corresponding to one direction list; and for each of the first candidate MVs, the acquiring the third preset number of the motion search directions to construct the at least one direction list, comprises:
   acquiring the third preset number of the motion search directions;
   determining an index of the third preset number of the motion search directions, by a degree of relation between each of the motion search directions and the first candidate MVs;
   constructing the at least one direction list corresponding to the first candidate MVs from the third preset number of the motion search directions and its index, wherein one direction list that the first candidate MVs used as the starting point when a motion search is preformed, is the at least one direction list of the first candidate MVs.

4. The method of claim 1, wherein
   the second preset number and the third preset number are both 8;
   the second preset number of the motion search amplitudes comprises ⅛ pixel, ¼ pixel, ½ pixel, 1 pixel, 2 pixels, 4 pixels, 8 pixels, 16 pixels;
   the third preset number of the motion search directions comprises right, left, bottom, top, bottom right, bottom left, top right, and top left.

5. The method of claim 1, wherein the constructing the first candidate list of the current coding block in the MMVD mode, comprises:
   acquiring a second candidate list of the current coding block, wherein the second candidate list is constructed in a preset inter-frame prediction mode and comprises a number of second candidate MVs;
   selecting sequentially the first preset number of second candidate MVs from the second candidate list to serve as the first candidate MVs in the first candidate list;

wherein the determining to obtain the optimal MV of the current coding block based on the MV offset of each of the first candidate MVs in the different motion combinations, comprises:
adding the first candidate MVs and one of the MV offset to obtain a corresponding search MV;
selecting a MV which rate distortion cost meets a preset cost condition as an optimal MV of the current coding block, from the second candidate MVs in the second candidate list and the search MVs.

6. The method of claim 5, wherein the preset cost condition is that the rate distortion cost is the smallest;
wherein the selecting the MV which the rate distortion cost meets the preset cost condition as the optimal MV of the current coding block, from the second candidate MVs in the second candidate list and the search MVs, comprises:
determining each of the second candidate MVs and prediction block corresponding to each of the search MV, and calculating first rate distortion cost of each of the second candidate MVs and each of the search MVs, by the corresponding prediction block, roughly selecting a fourth preset number of MVs with the smallest first rate distortion cost;
calculating second rate distortion cost of each of the roughly selected MVs by the corresponding prediction block, and finely selecting the MV with the smallest second rate distortion cost as the optimal MV of the current coding block;
wherein calculation complexity of the first rate distortion cost is lower than calculation complexity of the second rate distortion cost, and the fourth preset number is any natural number.

7. The method of claim 5, wherein
the first candidate list comprises a spatial candidate MV and a temporal candidate MV; and the preset interframe prediction mode comprises a merge mode and an advanced MV prediction (AMVP) mode.

8. The method of claim 1, wherein
the first candidate MVs comprise two sub-MVs corresponding to two directions respectively;
wherein a current frame which the current coding block located is a B-frame, the taking the first candidate MVs as the starting point, and searching by different motion combinations of the motion search amplitudes and the motion search directions, to obtain the MV offset of the first candidate MV under the different motion combinations, comprises:
taking at least one sub-MV of the first candidate MVs as a starting point, and searching by different motion combinations of the motion search amplitudes and the motion search directions, to obtain the MV offset of the first candidate MVs under the different motion combinations, wherein the MV offset comprises two sub-MV offsets corresponding to the two directions.

9. The method of claim 8, wherein the taking at least one sub-MV of the first candidate MVs as the starting point, and searching by different motion combinations of the motion search amplitudes and the motion search directions, to obtain the MV offset of the first candidate MVs under the different motion combinations, comprises:
taking a first sub-MV of the first candidate MVs as a starting point, and searching by different motion combinations of the motion search amplitudes and the motion search directions, to obtain a first sub-MV offset of the first candidate MVs under the different motion combinations;
taking a second sub-MV of the first candidate MVs as a starting point, and searching by different motion combinations of the motion search amplitudes and the motion search directions, to obtain a second sub-MV offset of the first candidate MV under the different motion combinations;
composing the MV offset of the first candidate MVs under the different motion combinations, by the first sub-MV offset under the different motion combinations and the second sub-MV offset;
wherein expression of syntax element of the MMVD mode comprises syntax elements in two directions of the first candidate MVs; and the syntax element of each directions comprises the MV offset, or a motion search direction index in the motion combinations corresponding to the MV offset.

10. The method of claim 8, wherein the taking at least one sub-MV of the first candidate MVs as the starting point, and searching by different motion combinations of the motion search amplitudes and the motion search directions, to obtain the MV offset of the first candidate MVs under the different motion combinations, comprises:
acquiring amplitudes of a first sub-MV and a second sub-MV of the first candidate MVs;
selecting a first sub-MV with an amplitude meeting a preset amplitude condition, from the first sub-MV and the second sub-MV;
taking the first sub-MV as a starting point, and searching by different motion combinations of the motion search amplitudes and the motion search directions, to obtain a first sub-MV offset of the first sub-motion direction under the different motion combinations;
obtaining a second sub-MV offset of the second sub-motion direction under the corresponding different motion combinations, by the first sub-MV offset of the first sub-MV under the different motion combinations;
composing the MV offset of the first candidate MVs under the corresponding motion combinations, by the first sub-MV offset and the second sub-MV offset of the first candidate MVs under the corresponding motion combination;
wherein expression of syntax element of the MMVD mode comprises syntax element corresponding to a direction of the first sub-MV; and the syntax element corresponding to the direction of the first sub-MV comprises the first sub-MV offset or a motion search direction index in the motion combination corresponding to the first sub-MV offset.

11. The method of claim 10, wherein
the preset amplitude condition is that which one of an amplitude of the first sub-MV and an amplitude of the second sub-MV is greater or equal; and the obtaining the second sub-MV offset of the second sub-motion direction under the corresponding different motion combinations, by the first sub-MV offset of the first sub-MVs under the different motion combinations, comprises:
acquiring an amplitude relationship between the second sub-MV and the first sub-MVs; and determining the second sub-MV offset of the second sub-motion direction corresponding to the motion combinations, based on the amplitude relationship and the first sub-MV offset in the different motion combinations; or
the preset amplitude condition is that which one of quotient of the amplitude of the first sub-MV and corresponding distance and quotient of the amplitude of the second sub-MV and corresponding distance is greater or equal; the corresponding distance of the first sub-MV is first distance between a first reference frame corresponding to the first sub-MV and the current frame; the corresponding distance of the second sub-MV is second distance between a second reference frame corresponding to the second sub-MV and the current frame; and the obtaining the second sub-MV offset of the second sub-motion direction under the corresponding different motion combinations, by the first sub-MV offset of the first sub-MVs under the different motion combinations, comprises:

acquiring an amplitude relationship between the second sub-MV and the first sub-MVs, and a distance relationship between the first distance and the second distance; and determining the second sub-MV offset of the second sub-motion direction corresponding to the motion combinations, based on the amplitude relationship, the distance relationship, and the first sub-MV offset under the different motion combinations.

12. An inter-frame prediction method based on a merge with motion vector difference (MMVD) mode, comprising:
constructing a first candidate list of a current coding block in the MMVD mode, wherein the first candidate list comprises a first preset number of first candidate motion vectors (MVs); and
each of the first preset number of first candidate MVs comprises two sub-MVs corresponding to two directions respectively;
determining a second preset number of motion search amplitudes and a third preset number of motion search directions;
taking at least one sub-MV of each first candidate MV as a starting point, and searching by different motion combinations of the motion search amplitudes and the motion search directions, to obtain a MV offset of the corresponding one first candidate MV under the different motion combinations, wherein the MV offset of the corresponding one first candidate MV comprises offsets of the two sub-MVs corresponding to the two directions;
determining to obtain an optimal MV of the current coding block based on the MV offset of each of the first candidate MVs in the different motion combinations.

13. The method of claim 12, wherein the taking at least one sub-MV of the first candidate MVs as the starting point, and searching by different motion combinations of the motion search amplitudes and the motion search directions, to obtain the MV offset of the first candidate MVs under the different motion combinations, comprises:
taking a first sub-MV of the first candidate MVs as a starting point, and searching by different motion combinations of the motion search amplitudes and the motion search directions, to obtain a first sub-MV offset of the first candidate MVs under the different motion combinations;
taking a second sub-MV of the first candidate MVs as a starting point, and searching by different motion combinations of the motion search amplitudes and the motion search directions, to obtain a second sub-MV offset of the first candidate MV under the different motion combinations;
composing the MV offset of the first candidate MVs under the different motion combinations, by the first sub-MV offset under the different motion combinations and the second sub-MV offset.

14. The method of claim 13, wherein expression of syntax element of the MMVD mode comprises syntax elements in two directions of the first candidate MVs; and the syntax element of each directions comprises the MV offset, or a motion search direction index in the motion combinations corresponding to the MV offset.

15. The method of claim 13, wherein
the composing the MV offset of the first candidate MVs under the different motion combinations, by the first sub-MV offset under the different motion combinations and the second sub-MV offset, comprises:
composing a number N of MV offsets of the first candidate MVs under different motion combinations, by different combinations of the first sub-MV offset under each motion combinations and the second sub-MV offset under each motion combinations, wherein, the number N is equal to a square of a product of a second predetermined number J and a third predetermined number K.

16. The method of claim 12, wherein the taking at least one sub-MV of the first candidate MVs as the starting point, and searching by different motion combinations of the motion search amplitudes and the motion search directions, to obtain the MV offset of the first candidate MVs under the different motion combinations, comprises:
acquiring amplitudes of a first sub-MV and a second sub-MV of the first candidate MVs;
selecting a first sub-MV with an amplitude meeting a preset amplitude condition, from the first sub-MV and the second sub-MV;
taking the first sub-MV as a starting point, and searching by different motion combinations of the motion search amplitudes and the motion search directions, to obtain a first sub-MV offset of the first sub-motion direction under the different motion combinations;
obtaining a second sub-MV offset of the second sub-motion direction under the corresponding different motion combinations, by the first sub-MV offset of the first sub-MV under the different motion combinations;
composing the MV offset of the first candidate MVs under the corresponding motion combinations, by the first sub-MV offset and the second sub-MV offset of the first candidate MVs under the corresponding motion combination.

17. The method of claim 16, wherein expression of syntax element of the MMVD mode comprises syntax element corresponding to a direction of the first sub-MV; and the syntax element corresponding to the direction of the first sub-MV comprises the first sub-MV offset or a motion search direction index in the motion combination corresponding to the first sub-MV offset.

18. The method of claim 16, wherein
the preset amplitude condition is that which one of an amplitude of the first sub-MV and an amplitude of the second sub-MV is greater or equal; and the obtaining the second sub-MV offset of the second sub-motion direction under the corresponding different motion combinations, by the first sub-MV offset of the first sub-MVs under the different motion combinations, comprises:
acquiring an amplitude relationship between the second sub-MV and the first sub-MVs; and determining the second sub-MV offset of the second sub-motion direction corresponding to the motion combinations, based on the amplitude relationship and the first sub-MV offset in the different motion combinations; or
the preset amplitude condition is that which one of quotient of the amplitude of the first sub-MV and corresponding distance and quotient of the amplitude of the second sub-MV and corresponding distance is greater or equal; the corresponding distance of the first sub-MV is first distance between a first reference frame corresponding to the first sub-MV and the current frame; the corresponding distance of the second sub-MV is second distance between a second reference frame corresponding to the second sub-MV and the current frame;

the obtaining the second sub-MV offset of the second sub-motion direction under the corresponding different motion combinations, by the first sub-MV offset of the first sub-MVs under the different motion combinations, comprises:

acquiring an amplitude relationship between the second sub-MV and the first sub-MVs, and a distance relationship between the first distance and the second distance; and determining the second sub-MV offset of the second sub-motion direction corresponding to the motion combinations, based on the amplitude relationship, the distance relationship, and the first sub-MV offset under the different motion combinations.

19. The method of claim 12, wherein the constructing the first candidate list of the current coding block in the MMVD mode, comprises:

acquiring a second candidate list of the current coding block, wherein the second candidate list is constructed in a preset inter-frame prediction mode and comprises a number of second candidate MVs;

selecting sequentially the first preset number of second candidate MVs from the second candidate list to serve as the first candidate MVs in the first candidate list;

wherein the determining to obtain the optimal MV of the current coding block based on the MV offset of each of the first candidate MVs in the different motion combinations, comprises:

adding the first candidate MVs and one of the MV offset to obtain a corresponding search MV;

selecting a MV which rate distortion cost meets a preset cost condition as an optimal MV of the current coding block, from the second candidate MVs in the second candidate list and the search MVs;

wherein the first candidate list comprises a spatial candidate MV and a temporal candidate MV; and the preset inter-frame prediction mode comprises a merge mode and an advanced motion vector prediction (AMVP) mode.

20. An inter-frame prediction apparatus based on a merge with motion vector difference (MMVD) mode, comprising: a processor and a memory coupled to each other; wherein the memory is configured to store a program; and the processor is configured to execute operations comprising:

constructing a first candidate list of a current coding block in the MMVD mode, wherein the first candidate list comprises a first preset number of first candidate motion vectors (MVs);

determining a second preset number of motion search amplitudes and a third preset number of motion search directions;

taking each of the first preset number of first candidate MVs as a starting point, and searching by different motion combinations of the motion search amplitudes and the motion search directions, to obtain a MV offset of each first candidate MV under the different motion combinations;

determining to obtain an optimal MV of the current coding block based on the MV offset of each of the first candidate MVs in the different motion combinations;

wherein, the first preset number, the second preset number, and the third preset number are integers; and the first preset number, the second preset number, and the third preset number are satisfied at least one of the following: the first preset number being greater than 2, the second preset number being greater than 6, the third preset number being greater than 4, and an index value of the motion search direction used by the first candidate MVs being related to the corresponding first candidate MVs; and for each of the first candidate MVs, the more the motion search direction is related to the first candidate MV, the smaller the index value of the motion search direction is.

* * * * *